(12) United States Patent
Joo et al.

(10) Patent No.: US 11,425,668 B2
(45) Date of Patent: Aug. 23, 2022

(54) ELECTRONIC DEVICE FOR PERFORMING DEVICE-TO-DEVICE COMMUNICATION AND METHOD THEREFOR

(71) Applicant: Samsung Electronics Co., Ltd., Suwon-si (KR)

(72) Inventors: Yusung Joo, Suwon-si (KR); Jaejun Lee, Suwon-si (KR); Jaesung Park, Suwon-si (KR); Wonshik Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 121 days.

(21) Appl. No.: 16/979,761

(22) PCT Filed: Mar. 11, 2019

(86) PCT No.: PCT/KR2019/002810
§ 371 (c)(1),
(2) Date: Sep. 10, 2020

(87) PCT Pub. No.: WO2019/177325
PCT Pub. Date: Sep. 19, 2019

(65) Prior Publication Data
US 2021/0045073 A1      Feb. 11, 2021

(30) Foreign Application Priority Data

Mar. 12, 2018   (KR) .................. 10-2018-0028807

(51) Int. Cl.
*H04J 3/06*         (2006.01)
*H04W 56/00*     (2009.01)
*H04W 76/14*     (2018.01)

(52) U.S. Cl.
CPC .......... *H04W 56/00* (2013.01); *H04W 76/14* (2018.02)

(58) Field of Classification Search
CPC ............................. H04W 56/00; H04W 76/14
See application file for complete search history.

(56) References Cited

U.S. PATENT DOCUMENTS

| 2016/0205644 | A1 | 7/2016 | Seo et al. |
| 2017/0006563 | A1 | 1/2017 | Lindoff et al. |

(Continued)

FOREIGN PATENT DOCUMENTS

| KR | 10-2016-0051740 A | 5/2016 |
| KR | 10-2016-0096985 A | 8/2016 |

(Continued)

*Primary Examiner* — Erika A Washington
(74) *Attorney, Agent, or Firm* — Jefferson IP Law, LLP

(57) ABSTRACT

According to various embodiments, an electronic device comprises a communication circuit, a processor, and a memory electrically connected to the processor, wherein the memory, when executed, can store commands for allowing the processor to: receive, from a first external electronic device, a first synchronization signal including first identification information through the communication circuit; synchronize the electronic device with the first external electronic device on the basis of at least a part of the information included in the first synchronization signal; receive, from a second external electronic device, a second synchronization signal including second identification information through the communication circuit; and control, on the basis of the second identification information and the first identification information, whether synchronization with second external electronic device occurs. Additional various embodiments are possible.

8 Claims, 16 Drawing Sheets

(56) References Cited

U.S. PATENT DOCUMENTS

| | | | |
|---|---|---|---|
| 2017/0142703 A1 | 5/2017 | Xue et al. | |
| 2017/0150296 A1 | 5/2017 | Jung | |
| 2017/0230236 A1 | 8/2017 | Kim et al. | |
| 2018/0049099 A1* | 2/2018 | Lee | H04W 76/14 |

FOREIGN PATENT DOCUMENTS

| | | |
|---|---|---|
| KR | 10-2017-0060735 A | 6/2017 |
| KR | 10-2017-0092877 A | 8/2017 |
| WO | 2016/186415 A1 | 11/2016 |

* cited by examiner

ELECTRONIC DEVICE FOR PERFORMING DEVICE-TO-DEVICE COMMUNICATION AND METHOD THEREFOR

CROSS-REFERENCE TO RELATED APPLICATION(S)

This application is a National Phase Entry of PCT international Application No. PCT/KR2019/002810, which was filed on Mar. 11, 2019, and claims priority to Korean Patent Application No. 10-2018-0028807 filed on Mar. 12, 2018, in the Korean Intellectual Property Office, the contents of which are incorporated herein by reference.

BACKGROUND

1. Field

The disclosure generally relates to an electronic device for performing device-to-device communication and a method of the same.

2. Description of the Related Art

Device-to-Device (D2D) communication-related standardization having a name of Proximity Services (ProSe) is being conducted in the 3rd-Generation Partnership Project (3GPP) standard. The D2D communication may be used for services such as Mission-Critical Push to Talk (MCPTT) for a special purpose like group communication for large numbers of relief personnel on the spot for public safety in disaster situations. In order to perform D2D communication, it is required to search for D2D UEs located near an electronic device and a link establishment step of establishing a radio link with a UE to which data is transmitted among the D2D UEs may be needed. The electronic device may receive a synchronization signal from a BS and perform synchronization according to the synchronization signal in order to search for adjacent D2D UEs. However, if the synchronization signal is not received, the electronic device may monitor whether synchronization signals (sync sources) of the adjacent D2D UEs are received. The electronic device may perform synchronization with a UE having a high priority through monitoring, or may transmit a synchronization signal, and may perform monitoring for selecting the sync source while the D2D communication is performed.

SUMMARY

An electronic device may perform monitoring to periodically or aperiodically select a sync source even during communication with an external electronic device. The electronic device may select a sync source in consideration of the signal having the highest strength among monitored sync sources and/or a BS signal-related priority. That is, the electronic device may select a sync source in a group with which the electronic device communicates or another sync source. For example, even though the electronic device communicates with an external electronic device belonging to group 1, if the strength of a synchronization signal from a sync source in group 2 is higher, the electronic device may perform synchronization on the basis of the synchronization signal from the sync source in group 2. In this case, communication between the electronic device and the external electronic device belonging to group 1 may be disconnected. Further, although the electronic device is not required to change the external electronic device with which the electronic device communicates, the electronic device may not receive data during periodic or aperiodic monitoring.

According to various embodiments, the electronic device is performing communication using identification information included in a sync source, or may select a sync source in a communication group with which to perform communication as a reference. Accordingly, various embodiments may provide an electronic device for, when the electronic device is performing communication or there is a sync source in a communication group with which to perform communication, selecting the sync source as a reference and not performing synchronization using a sync source in another communication group, and a method of operating the same.

Various embodiments may provide an electronic device for preventing packet loss through efficient monitoring, and a method of operating the same.

In accordance with an aspect of the disclosure, an electronic device is provided. The electronic device includes: a communication circuit; a processor; and a memory electrically connected to the processor, wherein the memory stores instructions causing the processor to, when executed, receive a first synchronization signal including first identification information from a first external electronic device through the communication circuit, perform synchronization of the first external electronic device with the electronic device, based on at least some pieces of information included in the first synchronization signal, receive a second synchronization signal including second identification information and second service-level information from a second external electronic device through the communication circuit, and control whether to perform synchronization with the second external electronic device based on the second identification information, the second service-level information, the first identification information, and the first service-level information. Various other embodiments are possible.

In accordance with another aspect of the disclosure, an electronic device is provided. The electronic device includes: a communication circuit; a processor; and a memory electrically connected to the processor, wherein the memory stores instructions causing the processor to, when executed, receive a first synchronization signal including first identification information and first service-level information from a first external electronic device through the communication circuit, and when the first identification and the first service-level information correspond to identification information stored in the memory, perform synchronization with the first external electronic device, based on at least some pieces of information included in the first synchronization signal.

In accordance with another aspect of the disclosure, an electronic device is provided. The electronic device includes: a communication circuit; a processor; and a memory electrically connected to the processor, wherein the memory stores instructions causing the processor to, when executed, generate a synchronization signal including identification information of the electronic device in a reserved field of a master information block (MIB-SL) defined in a $3^{rd}$-Generation Partnership Project (3GPP) and transmit the generated synchronization signal to a first external electronic device through the communication circuit.

According to various embodiments, it is possible to provide an electronic device that does not reference a synchronization signal received from an external electronic device that cannot perform communication on the basis of identification information of a communication group or an individual terminal with which the electronic device is communicating or is to communicate, and a method thereof. Accordingly, even though synchronization signals are received from a plurality of external electronic devices, the electronic device may continuously select a synchronization signal of a communication group or an individual terminal with which the electronic device is communicating or is to communicate.

According to various embodiments, when a radio link is generated but the electronic device does not transmit data (for example, when the electronic device receives data), the electronic device may not monitor a synchronization signal of an external electronic device with which the electronic device is not communicating. Accordingly, it is possible to prevent packet loss, which interrupts reception of data, during monitoring.

DETAILED DESCRIPTION

Figure 1:
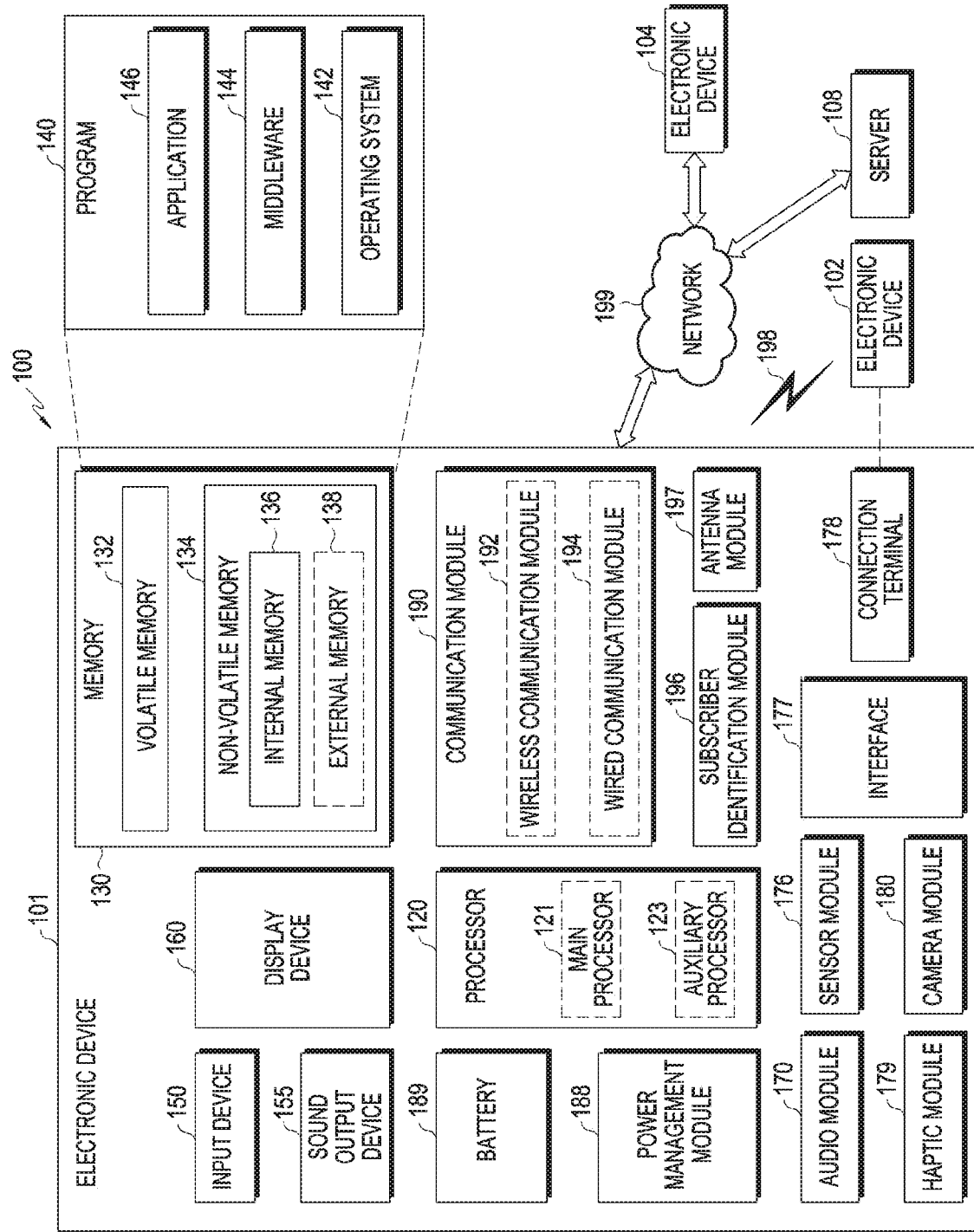
FIG. 1 is a block diagram illustrating an electronic device 101 within a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication), or an electronic device 104 or a server 108 via a second network 199 (e.g., a long-range wireless communication). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, and an antenna module 197. In some embodiments, at least one (e.g., the display device 160 or the camera module 180) of the components may be omitted from the electronic device 101, or other components may be added in the electronic device 101. In some embodiments, some of the components may be integrated and implemented as in, for example, the sensor module 176 (e.g., a fingerprint sensor, an iris sensor, or an illuminance sensor) embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing and computation. The processor 120 may load and process a command or data received from another component (e.g., the sensor module 176 or the communication module 190) in volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from the main processor 121. Additionally or alternatively, the auxiliary processor 123 may be adapted to consume less power than the main processor 121, or to be specific to a specified function. Here, the auxiliary processor 123 may be operated separately from or embedded in the main processor 121.

In such a case, the auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101, for example, software (e.g., the program 140) and input data or output data for a command related thereto. The memory 130 may include the volatile memory 132 or the non-volatile memory 134.

The program 140 is software stored in the memory 130, and may include, for example, an operating system (OS) 142, middleware 144, or an application 146.

The input device 150 is a device configured to receive a command or data to be used by a component (e.g., the processor 120) of the electronic device 101, from the outside (e.g., a user) of the electronic device 101, and may include, for example, a microphone, a mouse, or a keyboard.

The sound output device 155 is a device configured to output sound signals to the outside of the electronic device 101, and may include, for example, a speaker or a receiver. The speaker may be used for general purposes, such as playing multimedia or playing record, and the receiver may be used only for incoming calls. According to an embodiment, the receiver may be formed integrally or separately from the speaker.

The display device 160 is a device configured to visually provide information to a user of the electronic device 101, and may include, for example, a display, a hologram device, or a projector and control circuitry to control a corresponding one of the display, hologram device, and projector. According to an embodiment, the display device 160 may include touch circuitry or a pressure sensor adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) wiredly or wirelessly coupled with the electronic device 101.

The sensor module 176 may generate an electrical signal or data value corresponding to an internal operational state (e.g., power or temperature) of the electronic device 101 or an environmental state external to the electronic device 101. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support specified protocols to be used for the electronic device 101 to be coupled with the external electronic device (e.g., the electronic device 102) wiredly or wirelessly. According to an embodiment, the interface 177 may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102), for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 is a module configured to manage power supplied to the electronic device 101, and may be implemented as at least part of, for example, a power management integrated circuit (PMIC).

The battery 189 is a device configured to supply power to at least one component of the electronic device 101, and may include, for example, a primary cell which is not rechargeable, a secondary cell which is rechargeable, or a fuel cell.

The communication module 190 may support establishing a wired communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a wired communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules 190 may be implemented as a single chip or may be implemented as separate chips, respectively.

According to an embodiment, the wireless communication module 192 may identify and authenticate the electronic device 101 in a communication network, using user information stored in the subscriber identification module 196.

The antenna module 197 may include at least one antenna for transmitting or receiving a signal or power to or from the outside of the electronic device 101. According to an embodiment, the communication module 190 (e.g., the wireless communication module 192) may transmit or receive a signal to or from the external electronic device via an antenna appropriate for a communication scheme.

At least some of the above-described components may be coupled mutually and communicate signals (e.g., commands or data) therebetween via an inter-peripheral communication scheme (e.g., a bus, general purpose input/output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more other external electronic devices. According to an embodiment, if the electronic device 101 should perform a function or a service automatically, or in response to a request, the electronic device 101, instead of, or in addition to, executing the function or the service, may request the one or more external electronic devices to perform at least part of the function related thereto. The one or more external electronic devices receiving the request may perform the function requested or an additional function, and transfer an outcome of the performing to the electronic device 101. The electronic device 101 may provide the function or service requested, with or without further processing of the received outcome. To that end, a cloud computing, distributed computing, or client-server computing technology may be used, for example.

Figure 2:
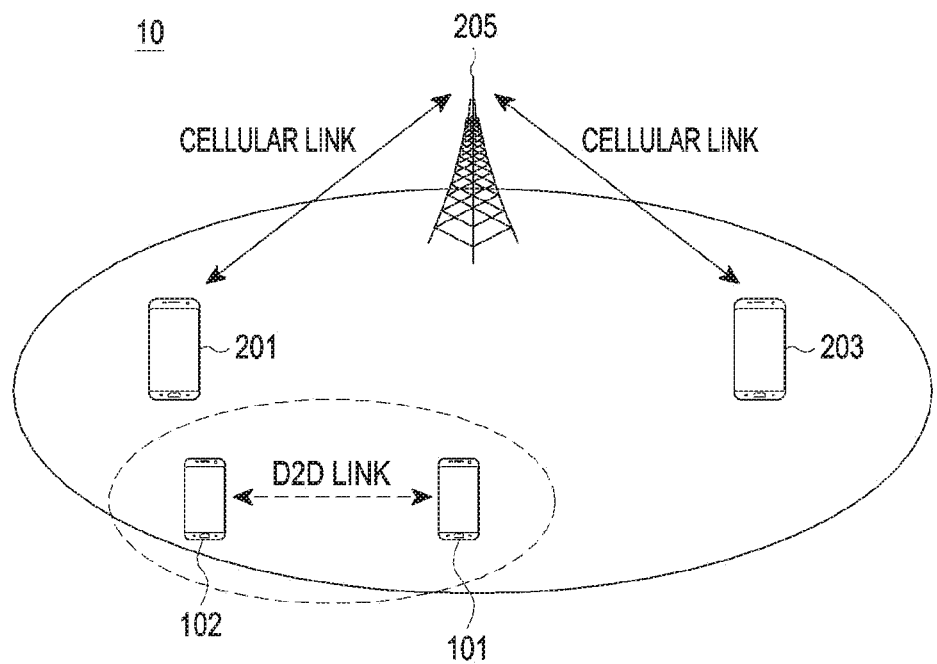
FIG. 2 illustrates a system of a Device-to-Device (D2D) communication system 10 according to various embodiments.

FIG. 2 is a diagram illustrating a Device-to-Device (D2D) communication system 10 according to various embodiments.

Referring to FIG. 2, the D2D communication system 10 according to various embodiments may include an electronic device 101 performing D2D communication and an external electronic device 102. The electronic device 101 may perform direct communication with the external electronic device 102. The D2D communication system 10 according to various embodiments may further include a BS 205 and electronic devices 201 and 203 (for example, the electronic device 104 of FIG. 1) connected to the BS. The electronic device 101 may communicate with the external electronic device 102 through the BS 205.

According to various embodiments, the electronic device 101 may perform synchronization by receiving a synchronization signal from the BS 205. Alternatively, the electronic device 101 may receive a synchronization signal from at least one external electronic device 102, 201, and 203, or may transmit a synchronization signal to at least one external electronic device 102, 201, and 203.

The electronic device 101 may generate a synchronization signal including sync identification information (for example, a Sidelink Synchronization Signal ID (SLSSID) or identification information of the electronic device 101. For example, the electronic device 101 may generate a synchronization signal including identification information of the electronic device 101 using at least some values of a proximity-based services (Prose) layer-2 group ID or at least some values of a layer-2 ID, which is a kind of MAC address in a reserved field of a Master Information Block (MIB-SL). For example, a Prose layer-2 group ID or a layer-2 ID is 24 bits, identification information may include all 24 bits of the Prose layer-2 group ID or the layer-2 ID, or may include some values of the Prose layer-2 group ID or the layer-2 ID (for example, upper 8 bits or lower 8 bits). The electronic device 101 may transmit the generated synchronization signal to the external electronic device 102.

According to various embodiments, the electronic device 101 may receive a synchronization signal including identification information from the external electronic device 102. For example, the electronic device 101 may receive a synchronization signal including identification information of the electronic device 102 using at least partial values of a proximity-based services (Prose) layer-2 group ID or at least a partial value of a layer-2 ID, which is a kind of MAC address in a reserved field of a Master Information Block (MIB-SL) from the external electronic device 102. When the synchronization signal is received, the electronic device 101 may determine whether the identification information included in the synchronization signal corresponds to the identification information of the electronic device 101. When the identification information included in the synchronization signal corresponds to the identification information of the electronic device 101, the electronic device 101 may perform synchronization on the basis of at least the part included in the received synchronization signal. When the identification information included in the synchronization signal does not correspond to the identification information of the electronic device 101, the electronic device 101 may ignore the received synchronization signal.

According to various embodiments, the electronic device 101 may select a synchronization signal of a communication group with which communication is being performed among a plurality of received synchronization signals, and perform synchronization.

Figure 3:
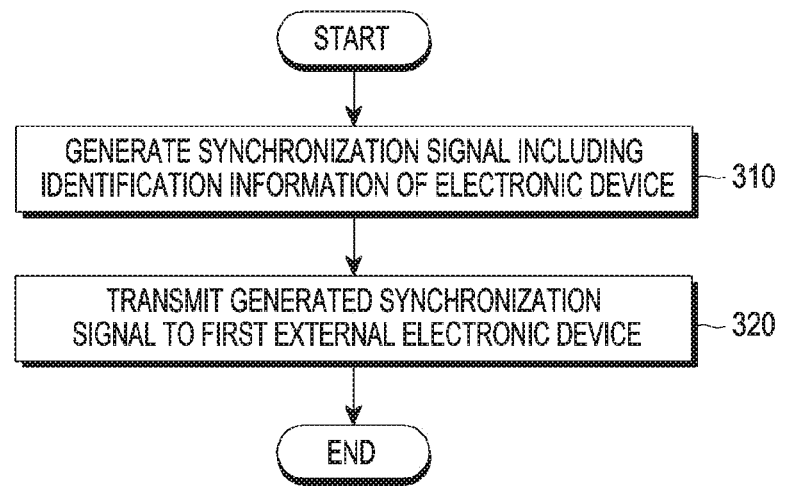
FIG. 3 is a flowchart illustrating an operation in which an electronic device generates a synchronization signal for synchronization according to various embodiments.
Figure 4:
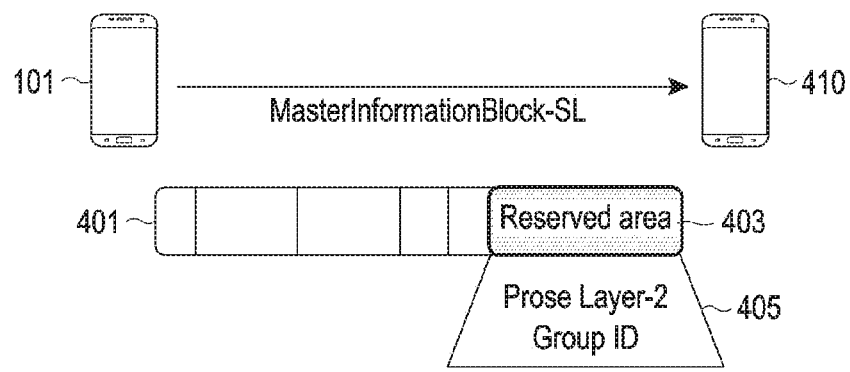
FIG. 4 illustrates identification information included in the synchronization signal generated in the operation of generating the synchronization signal for D2D communication according to various embodiments.

FIG. 3 is a flowchart illustrating an operation in which an electronic device generates a synchronization signal for synchronization according to various embodiments. FIG. 4 illustrates identification information included in a synchronization signal generated in the operation of generating a synchronization signal for D2D communication according to various embodiments.

According to various embodiments, the electronic device 101 (for example, the processor 120) may perform control to generate a synchronization signal including identification information of the electronic device 101 in operation 310. For example, the performance of a specific operation by the electronic device 101 may be, for example, direct performance of the specific operation by the processor 120 included in the electronic device 101 or control of other hardware to perform the specific operation. In operation 310, for example, the processor 120 may control the communication module 190 to generate the synchronization signal including the identification information of the electronic device 101. Alternatively, the performance of a specific operation by the electronic device 101 may be, for example, the performance of the specific operation by the processor 120 according to execution of at least one instruction stored in the memory 130 included in the electronic device 101 or the control of other hardware to perform the specific operation. For example, as illustrated in FIG. 4, the electronic device 101 may generate a synchronization signal including identification information of the electronic device 101 using at least some pieces of information of a proximity-based services (Prose) layer-2 group ID 405, which is identification information of the electronic device 101, in a reserved field 403 of a master information block (MIB-SL) 401. The identification information of the electronic device 101 may include at least one of at least some values of the Prose layer-2 group ID 405 or at least some values of the layer-2 ID. Further, the electronic device 101 may generate a synchronization signal further including service-level information in the reserved field 403 of the MIB-SL 401. The service-level information may include at least some of information on the number of delays of the synchronization signal from an initial source device, information on a range indicating application to all groups or individual groups, or priority information indicating a signal priority.

For example, when the range information included in the service-level information is configured as "0", the range information may be a signal for serving a specific group. When the range information included in the service-level information is configured as "1", the range information may be a signal for serving a plurality of groups (or all groups). At this time, when the range information included in the service-level information indicates a signal for serving a plurality of groups (or all groups), the signal may be processed as a signal having a high priority, and the range information may include priority information indicating the priority. Specifically, when the range information is used as the priority information, for example, when the range information included in the service-level information is configured as "0", the range information may be a signal for performing synchronization according to the 3GPP standard. When the range information included in the service-level information is configured as "1", the range information may be a signal indicating a normal priority. When the range information is configured as "2", the range information may be a signal indicating a priority higher than "1". For example, when the range information of the synchronization signal for synchronization of the electronic device 101 is configured as "1" and a signal strength is higher than a predetermined signal strength (for example, the signal strength is higher than a synchronization signal selection condition), the electronic device 101 may not measure the signal strength of another synchronization signal. Alternatively, when a synchronization signal having signal strength higher than a predetermined signal strength (for example, a signal strength satisfying a synchronization signal reselection condition) is found in the state in which the electronic device 101 performs synchronization with a synchronization signal having the range information configured as "1" or when the range information of the synchronization signal is configured as "2" and the signal strength is higher than the predetermined signal strength (for example, the signal strength satisfies a synchronization signal selection condition), the electronic device 101 may perform synchronization with the found synchronization signal. Alternatively, when the range information of the synchronization signal for synchronization of the electronic device 101 is configured as "2" and the signal strength is higher than the predetermined signal strength (for example, a signal strength satisfying the synchronization signal selection condition), the electronic device 101 may not measure the signal strength of another synchronization signal. Alternatively, when a synchronization signal having a signal strength higher than the predetermined signal strength (for example, a signal strength satisfying the synchronization signal reselection condition) is found in the state in which the electronic device 101 performs synchronization with a synchronization signal having range information configured as "2", the electronic device 101 may perform synchronization with the found synchronization signal. As described above, the synchronization signal having the high priority may be used as range information that can be applied to the former group.

The MIB-SL is an MIB-SL defined in the 3rd-Generation Partnership Project (3GPP), and may be inserted into a Physical Sidelink Broadcast Channel (PSBCH) of synchronization signals and transmitted. According to the 3GPP standard, the reserved field 403 of the MIB-SL is a reserved field which is not used for transmission of valid data, and thus the size of the synchronization signal may not increase even though identification information of the electronic device 101 is included in the reserved field of the MIB-SL.

Referring back to FIG. 3, in operation 320, the electronic device 101 may transmit the generated synchronization signal to a first external electronic device. For example, as illustrated in FIG. 4, the electronic device 101 may transmit a synchronization signal including the Prose layer-2 group ID 405 in the reserved field 403 of the MIB-SL 401 to a first external electronic device 410 (for example, the electronic device 102 of FIG. 2). The Prose layer-2 group ID 405 illustrated in FIG. 4 may be all or part of the Prose layer-2 group ID.

The electronic device 101 may periodically transmit a synchronization signal to the first external electronic device, and the period at which the synchronization signal is transmitted may be 40 ms. The first external electronic device 410 may receive the synchronization signal from the electronic device 101 and determine whether to perform synchronization on the basis of the received synchronization signal. Hereinafter, a method of performing synchronization is described with reference to FIGS. 5 to 7.

Figure 5:
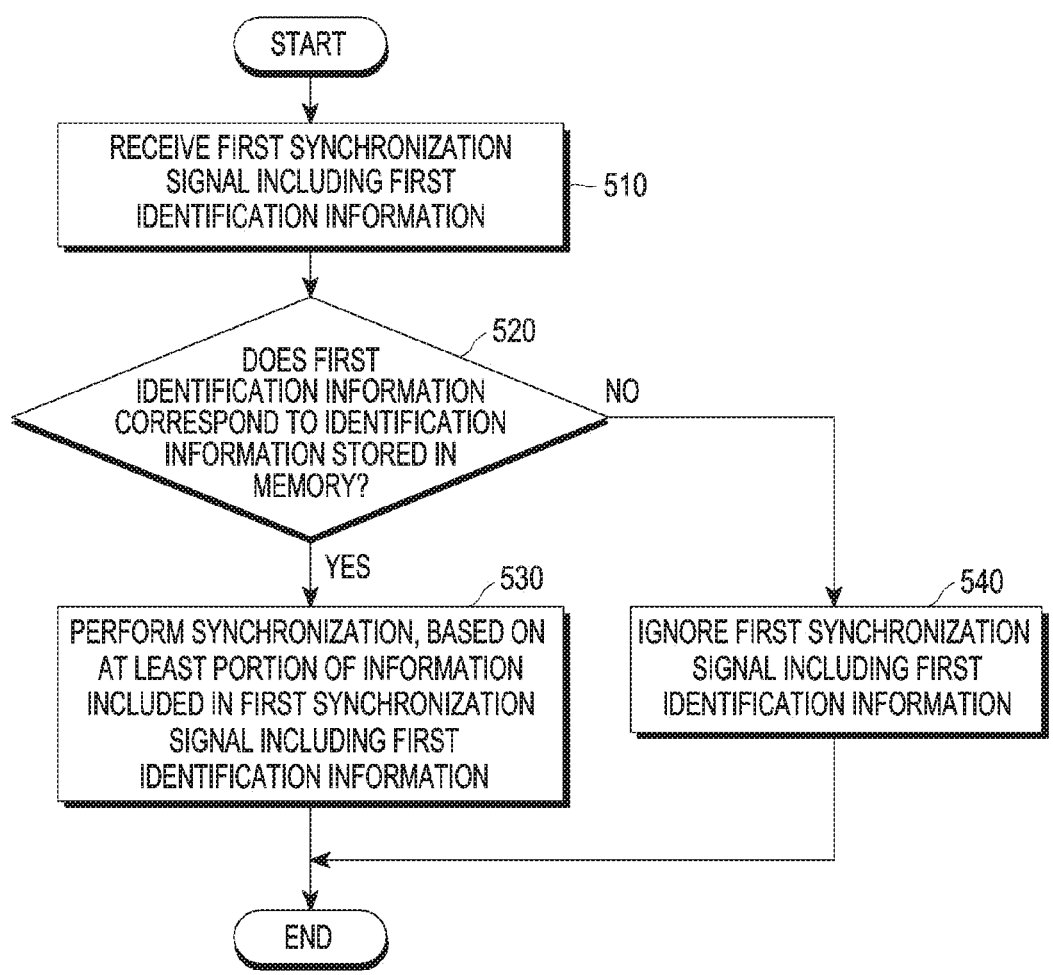
FIGS. 5 and 6 are flowcharts illustrating an operation in which an electronic device receives a synchronization signal for synchronization according to various embodiments.
Figure 6:
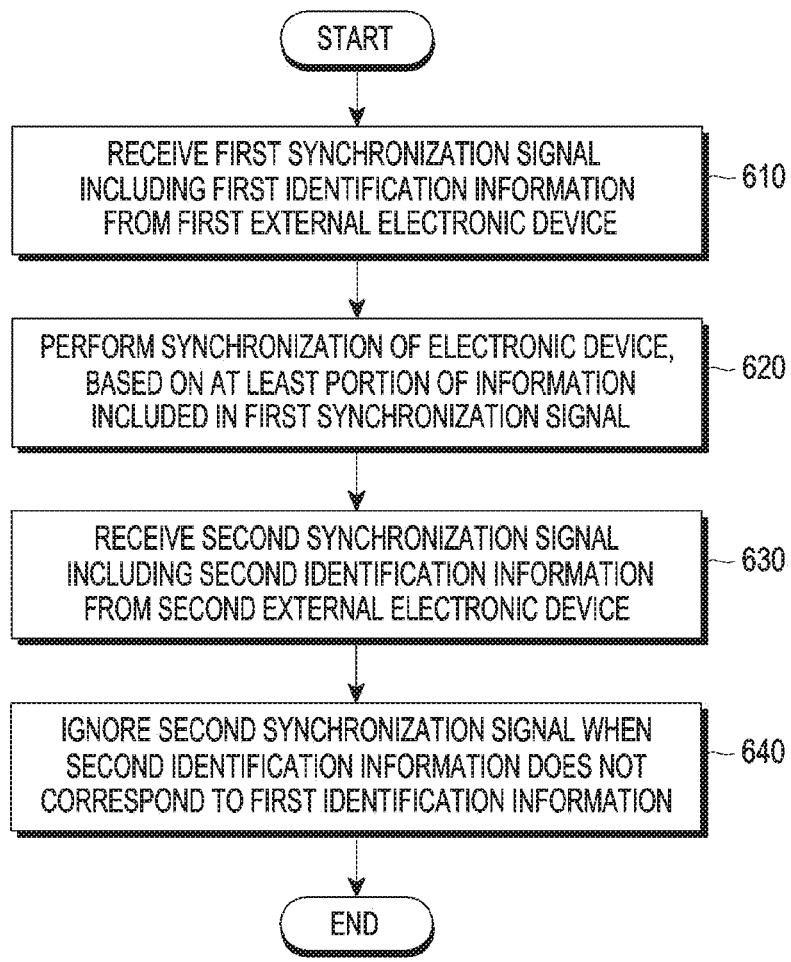
Figure 7:
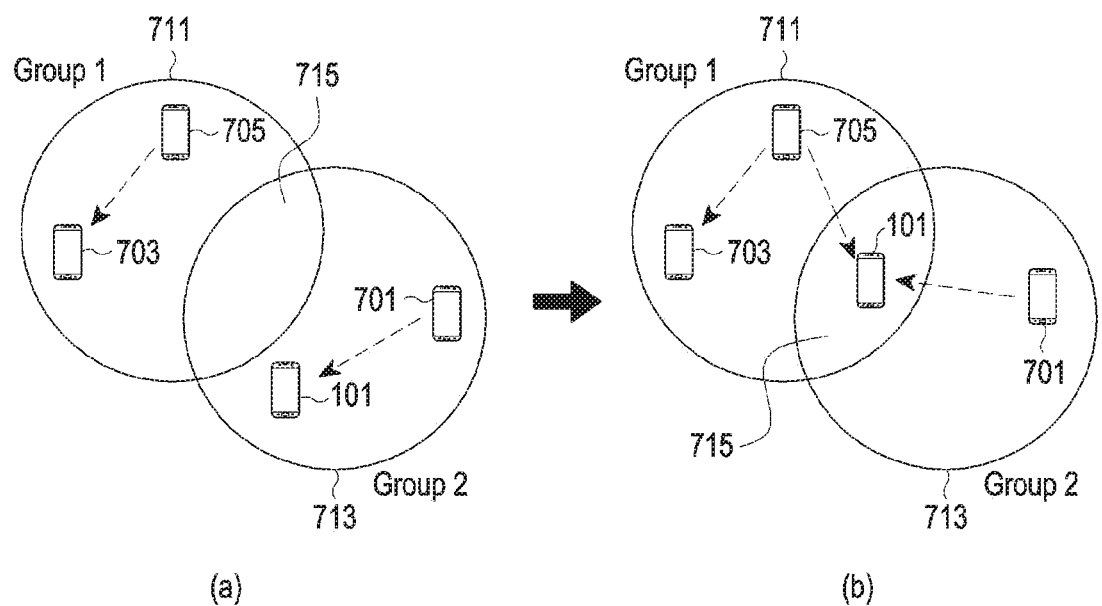
FIG. 7 illustrates an electronic device receiving a synchronization signal from a plurality of external electronic devices according to various embodiments.

FIGS. 5 and 6 are flowcharts illustrating an operation in which an electronic device receives a synchronization signal for synchronization according to various embodiments. FIG. 7 illustrates an electronic device receiving a synchronization signal from a plurality of external electronic devices according to various embodiments.

According to various embodiments, the electronic device 101 (for example, the processor 120) may receive a first synchronization signal including first identification information from the first external electronic device (for example, the electronic device 102 of FIG. 2) for at least a portion of a first time interval in operation 510. When the first time interval passes, the electronic device 101 may receive the first synchronization signal for at least a portion of a second time interval. For example, as illustrated in FIG. 7, the electronic device 101 may receive the first synchronization signal including identification information from a first external electronic device 701. FIG. 7A illustrates that the electronic device 101 receives a synchronization signal from one external electronic device 701, and FIG. 7B illustrates that the location of the electronic device 101 is moved and that a plurality of synchronization signals is received from a plurality of external electronic devices 701 and 705. Group #1 711 and group #2 713 illustrated in FIG. 7 may be groups of electronic devices capable of performing communication. For example, the "group" may be configured in advance, and the electronic device 101 may receive relevant information from a nonvolatile memory, a UICC/USIM, or a server. For example, the electronic device 101 belonging to group #2 713 may communicate with the external electronic device 701, and may not communicate with the external electronic device 703 and the external electronic device 705 belonging to group #1 711. In the embodiment of FIG. 7, the first external electronic device 701 is indicated by reference numeral 701, but is not limited thereto.

Referring back to FIG. 5, the electronic device 101 may determine whether first identification information corresponds to identification information stored in a memory (for example, the memory 130) in operation 520 according to various embodiments. For example, the electronic device 101 may determine whether the first identification information is the same as at least some values of the Prose layer-2 group ID or at least some values of the layer-2 ID, that is, the stored identification information. When the first identification information is the same as at least some values of the stored Prose layer-2 group ID or at least some values of the stored layer-2 ID, the electronic device 101 may determine that the first identification information corresponds to the stored identification information. The first identification information may be included in the reserved field of the MIB-SL defined in 3GPP. The first identification information may be the Prose layer-2 group ID, the layer-2 ID, some values thereof (for example, upper 8 bits or lower 8 bits of the layer-2 group ID or the layer-2 ID), or a preconfigured value for providing a service. The stored identification information may be the Prose layer-2 group ID, which is information for identifying the communication group with which the electronic device 101 is communicating. When the electronic device 101 receives a plurality of synchronization signals before a group of interest is configured, the electronic device 101 may perform synchronization on the basis of the synchronization signal having the highest strength (Reference Signal Received Power (RSRP)) among the plurality of received synchronization signals and/or a BS signal-related priority. Further, the electronic device 101 may store the identification information in the memory on the basis of the synchronization signal for the performance of synchronization.

Referring back to FIG. 5, when it is determined that the first identification information corresponds to the identification information stored in the memory, the electronic device 101 may perform synchronization with the first external electronic device on the basis of at least a portion of the first synchronization signal including the first identification information in operation 530. For example, in FIG. 7, the electronic device 101 may configure information on group #2 713, to which the first external electronic device 701 belongs, as the identification information. The electronic device 101 may receive the first synchronization signal from the first external electronic device 701 and determine whether the first identification information included in the received first synchronization signal corresponds to the information on group #2 713 stored in the memory. When the first identification information corresponds to the information on group #2 713 stored in the memory, the electronic device 101 may perform synchronization with the first external electronic device 701.

Referring back to FIG. 5, when it is determined that the first identification information does not correspond to the identification information stored in the memory, the electronic device 101 may ignore the first synchronization signal including the first identification information in operation 540. Ignoring the synchronization signal may mean that the electronic device 101 does not perform synchronization on the basis of the received synchronization signal even though the synchronization signal is received. For example, as illustrated in FIG. 7, the electronic device 101 may receive a second synchronization signal from the external electronic device 705. The electronic device 101 may identify that the identification information included in the second synchronization signal does not correspond to the stored identification information. Accordingly, the electronic device 101 may ignore the second synchronization signal and operate on the basis of the first synchronization signal from the external electronic device 701.

Referring to FIG. 6, in operation 610, the electronic device 101 (for example, the processor 120) may receive the first synchronization signal including the first identification information from the first external electronic device (for example, the electronic device 102 of FIG. 2) according to various embodiments. For example, as illustrated in FIG. 7, the electronic device 101 may receive the first synchronization signal including the first identification information from the first external electronic device 701. In the description of FIGS. 6 and 7, the electronic device 101 and the first external electronic device 701 may belong to group #1 711, and the second external electronic device 703 may belong to group #2 713 together with a third external electronic device 705, as illustrated in FIG. 7. FIG. 7A illustrates the state in which the electronic device 101 is able to receive a synchronization signal from the first external electronic device 701. FIG. 7B illustrates the state in which the location of the electronic device 101 is moved to an area 715 in which both group #1 711 and group #2 713 can be formed, and thus the synchronization signal can be received from both the first external electronic device 701 and the second external electronic device 703. In the description made with reference to FIG. 6, it is assumed that the electronic device 101 communicates with the first external electronic device 701 belonging to group #2 713.

Referring back to FIG. 6, in operation 620, the electronic device 101 may perform synchronization on the basis of at least some of the information included in the first synchronization signal. For example, as illustrated in FIG. 7, the electronic device 101 may perform synchronization with the first external electronic device 701 on the basis of at least some of the information included in the first synchronization signal received from the first external electronic device 701.

Referring back to FIG. 6, in operation 630, the electronic device 101 may receive the second synchronization signal including second identification information from the second external electronic device according to various embodiments. For example, as illustrated in FIG. 7, the electronic device 101 may receive the second synchronization signal including information group #1 711, that is, the second identification information, from the second external electronic device 703.

Referring back to FIG. 6, when the second identification information does not correspond to the first identification information, the electronic device 101 may ignore the second synchronization signal in operation 640 according to various embodiments. For example, as illustrated in FIG. 7, when information on group #1 711, which is the second identification information, does not correspond to information on group #2 713, which is the first identification information, the electronic device 101 may ignore the second synchronization signal.

According to various embodiments, the electronic device 101 may continuously select a synchronization signal of the current communication group with which the electronic device 101 currently communicates by determining the identification information included in the received synchronization signal. The case in which the identification information included in the synchronization signal represents a plurality of groups is described with reference to FIGS. 8 and 9.

Figure 8:
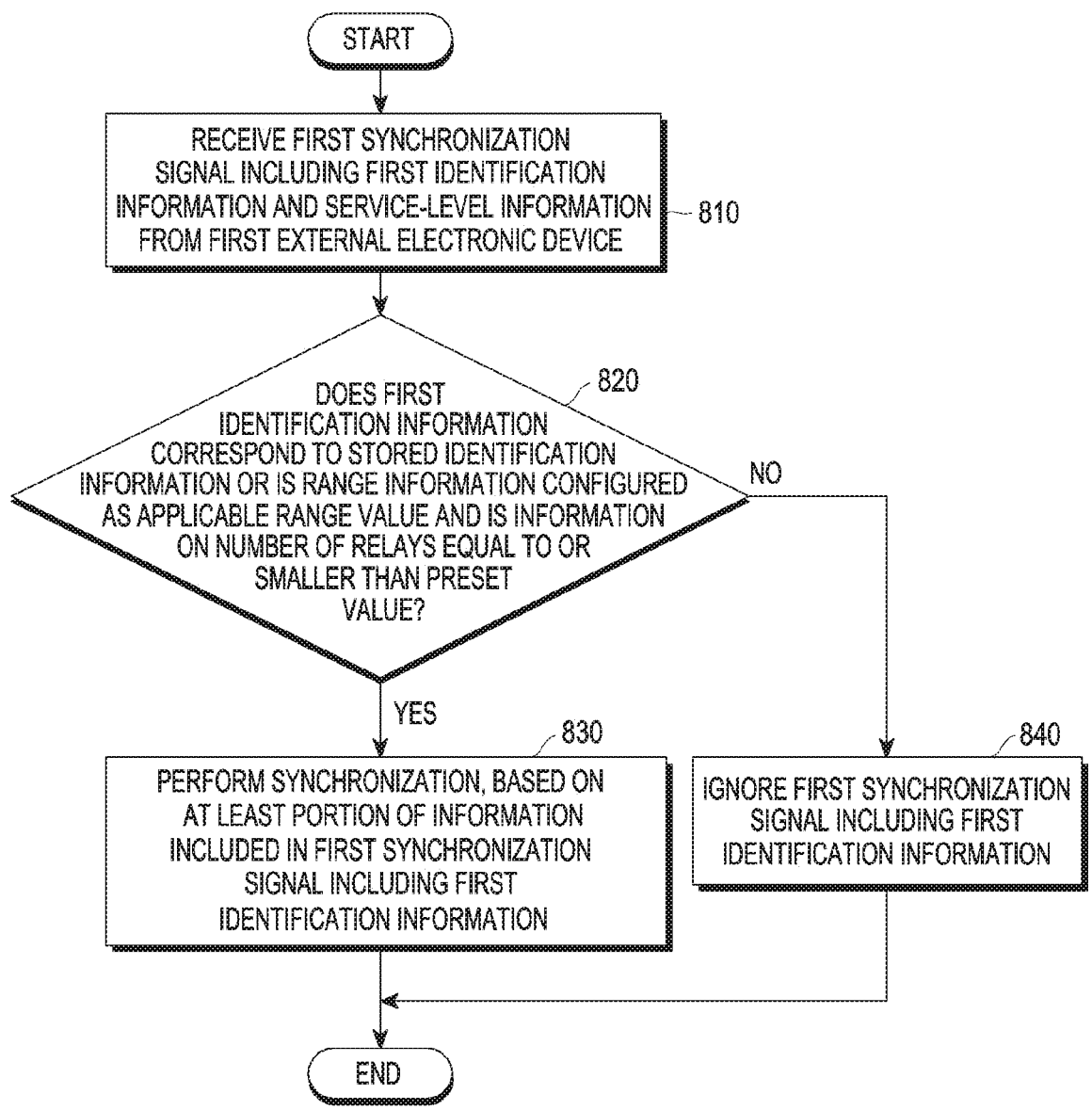
FIG. 8 is a flowchart illustrating an operation in which an electronic device receives a synchronization signal for synchronization according to various embodiments.
Figure 9:
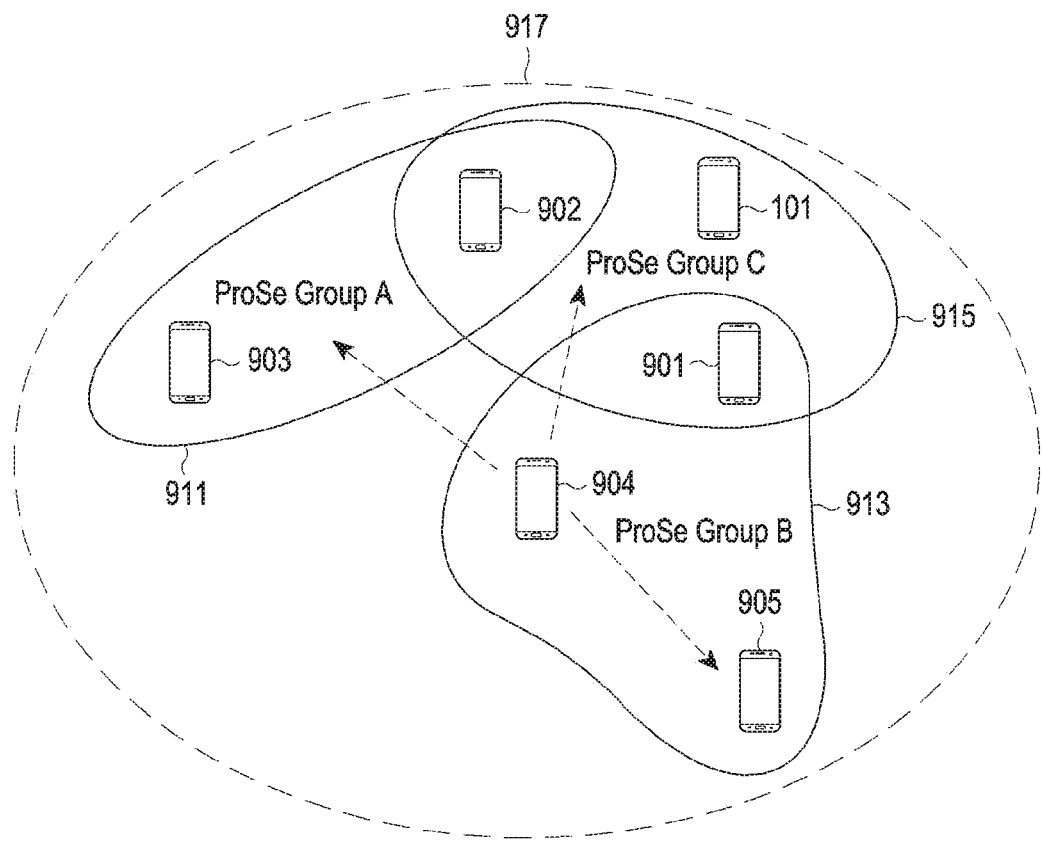
FIG. 9 illustrates a plurality of electronic devices included in different groups according to various embodiments.
Figure 10:
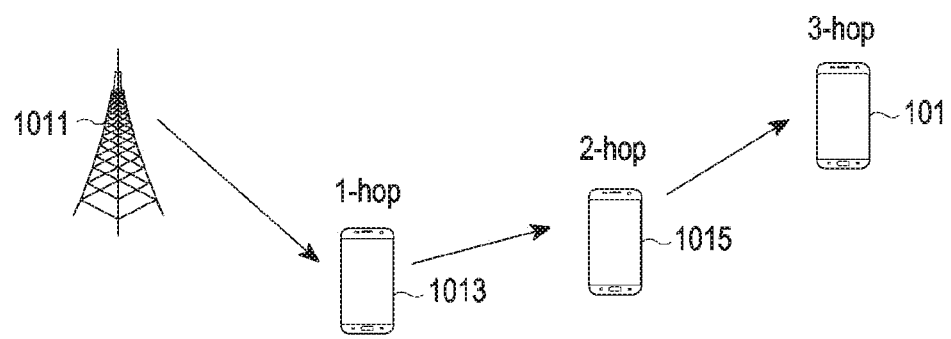
FIG. 10 illustrates multiple hopping of a synchronization signal according to various embodiments.
Figure 11A:
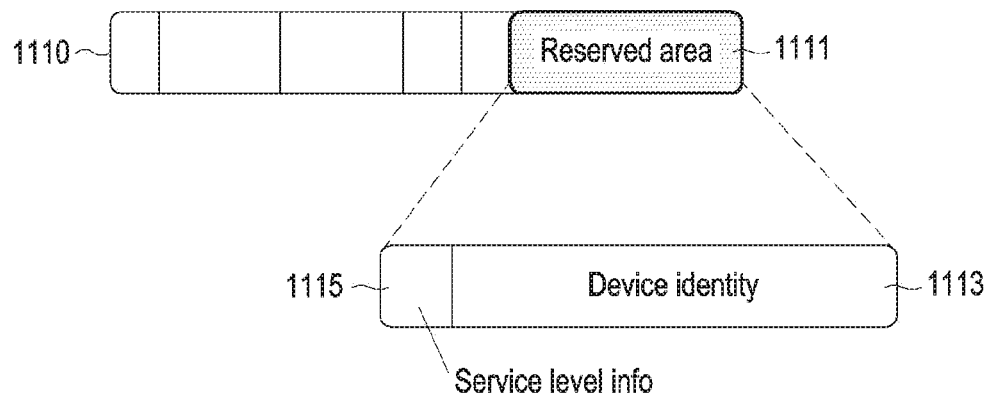
FIG. 11A illustrates a part of a synchronization signal including identification information and service-level information according to various embodiments.
Figure 11B:
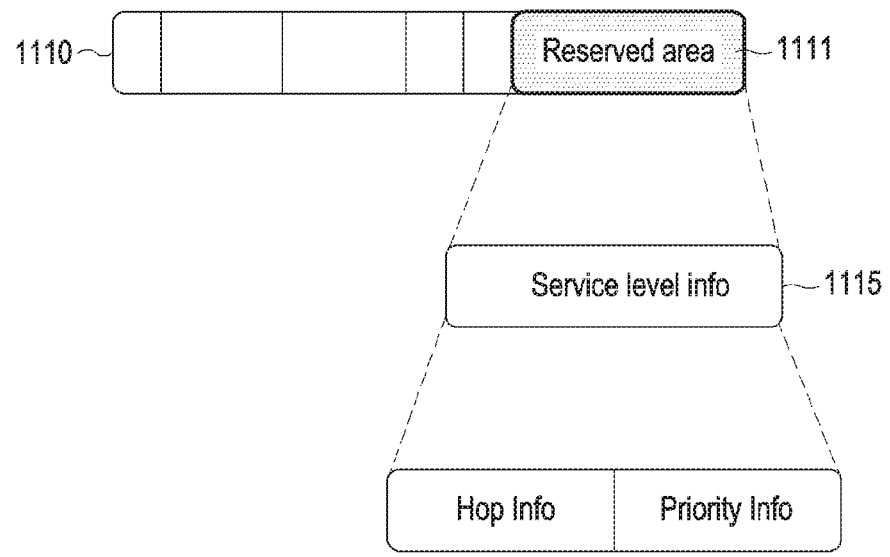
FIG. 11B illustrates a part of a synchronization signal including other identification and service-level information according to various embodiments.

FIG. 8 is a flowchart illustrating an operation in which an electronic device receives a synchronization signal for synchronization according to various embodiments. FIG. 9 illustrates a plurality of electronic devices included in different groups according to various embodiments. FIG. 10 illustrates multiple hopping of a synchronization signal according to various embodiments. FIG. 11A illustrates a part of a synchronization signal including identification information and service-level information according to various embodiments. FIG. 11B illustrates a part of a synchronization signal including identification information and service-level information according to various embodiments.

In operation 810, according to various embodiments, the electronic device 101 (for example, the processor 120) may receive a first synchronization signal including first identification information and service-level information from a first external electronic device (for example, the electronic device 102 of FIG. 2). The service-level information may include at least some of information on the number of relays of the first synchronization signal from a source device and priority information indicating a priority of a range information signal applicable to all groups. For example, as illustrated in FIG. 9, the electronic device 101 may be included in a ProSe group C 915 together with a first external electronic device 901. A second external electronic device 902 and a third external electronic device 903 may belong to a ProSe group A 911, and a fourth external electronic device 904 and a fifth external electronic device 905 may belong to a ProSe group B 913. In the description of FIG. 8, it is assumed that the ProSe group A 911, the ProSe group B 915, and the ProSe group C 913 are in an environment in which inter-group communication can be established. According to various embodiments, similar to BS synchronization, it is assumed that UEs within a group may be synchronized or that UEs in all groups may be synchronized, and the fourth external electronic device 904 operates as a source (sync source) device of the synchronization signal. It is assumed that only the second external electronic device 902, the third external electronic device 903, and the fifth external electronic device 905 are located to receive a synchronization signal from the fourth external electronic device 904. The electronic device 101 may relay and receive a synchronization signal of the fourth external electronic device 904, which is a source device, from the third external electronic device 903. Identification information included in the synchronization signal may be used for synchronization of UEs in all groups 917 on the basis of service-level information having a preconfigured value that represents all groups 917, such as the ProSe group A 911, the ProSe group B 915, and the ProSe group 913, or a configured range value applicable to all groups 917. When a BS synchronization signal is used, the synchronization signal may be applied to synchronization of all groups through an in-coverage field value and an SLSSID indicating the BS synchronization signal. When service-level information is used as priority information, the value having the highest priority (for example, "2") may be applied to synchronization of all groups. The service-level information may be transferred from the fourth external electronic device 904, which is a source device, to the third external electronic device 903, and may correspond to "2", which is the number of relays from the source device since the service-level information was transferred from the third external electronic device 903 to the electronic device 101. Referring to FIG. 10, when the synchronization signal is received from the BS 1011, a fourth external electronic device 1013 may transmit a synchronization signal including identification information, which is a preset value to represent a plurality of groups, or service-level information indicating a range value of 1, which can be applied to all groups, and the number of relays of 0 to a third external electronic device 1015. When the synchronization signal is received, the third external electronic device 1015 may transmit a synchronization signal including identification information, which is a preset value representing a plurality of groups, or service-level information indicating a range value of 1, which can be applied to all groups, and the number of relays of 1 to the electronic device 101. According to various embodiments, the electronic device 101 may receive the synchronization signal including identification information and service-level information. The service-level information may be inserted into a reserved field of an MIB-SL and received. For example, as illustrated in FIG. 11A, a device identity 1113, which is identification information, and service-level information 1115, which is the service-level information, may be included in a reserved field 1111 of an MIB-SL 1110. At this time, the service-level information 1115 may include hop info 1117 indicating the number of relays and priority info 1119 indicating priority information, as illustrated in FIG. 11B.

Referring back to FIG. 8, in operation 820, the electronic device 101 may determine whether first identification information included in the first synchronization signal corresponds to identification information stored in the memory or whether range information included in the service-level information is configured as a range value applicable to all groups and the number of relays included in the service-level information is equal to or smaller than a preset value according to various embodiments. For example, as illustrated in FIG. 11, the electronic device 101 may determine whether the device identity 1113, which is identification information included in the first synchronization signal, corresponds to the stored identification information and whether information on the number of relays of the service-level information 1115, which is the service-level information, is smaller than or equal to a preset value.

Referring back to FIG. 8, according to various embodiments, when the first identification information included in the first synchronization signal corresponds to the identification information stored in the memory or when range information included in the service-level information is configured as a range value applicable to all groups and information on the number of relays included in the service-level information is equal to or smaller than a preset value, the electronic device 101 may perform synchronization on the basis of at least a portion of the first synchronization signal including the first identification information in operation 830. According to various embodiments, when the first identification information included in the first synchronization signal does not correspond to the identification information stored in the memory or when information on the number of relays included in the service-level information is larger than a preset value, the electronic device 101 may ignore the first synchronization signal including the first identification information in operation 840. When the information on the number of relays included in the service-level information is larger than a preset value, it means that a plurality of hop sync relays is performed from the source device, and thus a time delay problem may be prevented.

As described above, according to various embodiments, the electronic device 101 may perform synchronization on the basis of the synchronization signal including identification information indicating a preset value that represents a plurality of groups or a service-level signal having a configured range value applicable to all groups. Accordingly, through a specific value preset to represent a plurality of different groups, the probability of an inadvertent sync collision occurring due to the source device may be reduced. Further, the electronic device 101 may ignore a synchronization signal for which multiple hop sync relays are performed. Accordingly, the electronic device 101 may prevent a time delay due to a hop sync relay.

Figure 12:
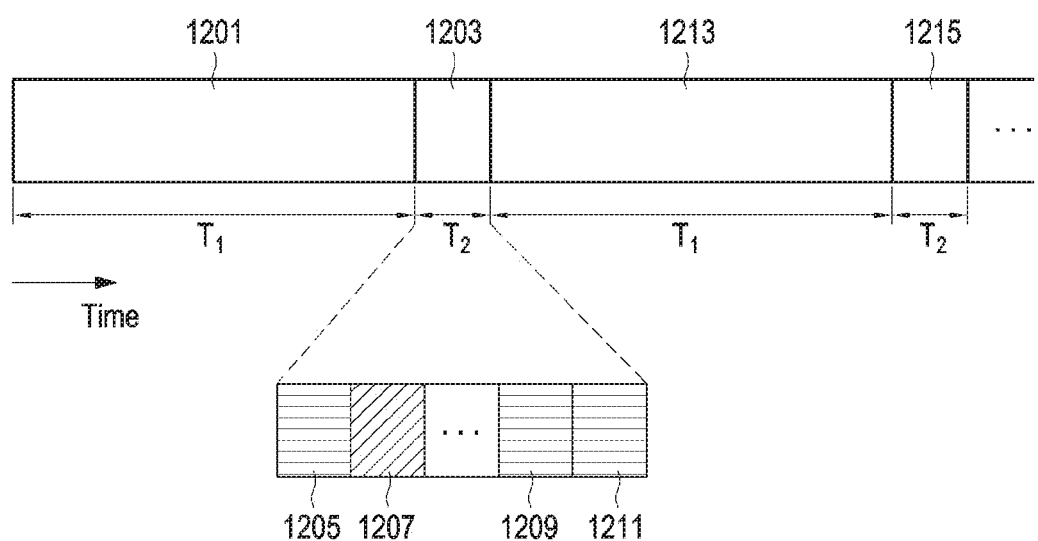
FIG. 12 illustrates an operation in which an electronic device monitors a synchronization signal according to various embodiments.
Figure 13:
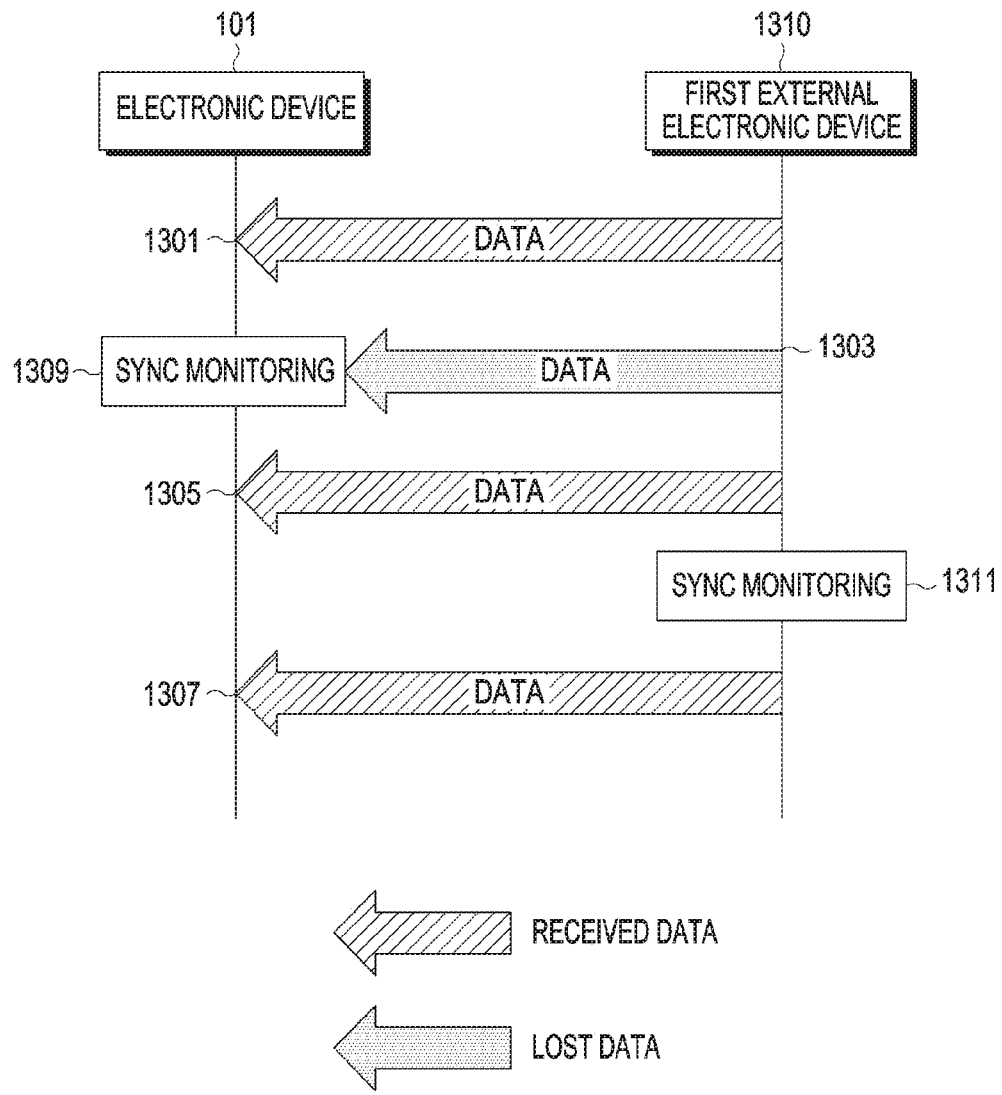
FIG. 13 illustrates packet loss according to various embodiments.

The electronic device 101 may not perform an operation for monitoring the synchronization source signal while the service-level information is used as priority information. Accordingly, it is possible to prevent packet loss which can occur due to periodic monitoring of the synchronization source by the electronic device 101. An operation of packet loss according to various embodiments is described with reference to FIGS. 12 and 13. FIG. 12 illustrates an operation in which an electronic device monitors a synchronization signal according to various embodiments. FIG. 13 illustrates packet loss according to various embodiments.

As illustrated in FIG. 12, the electronic device 101 performing D2D communication may perform monitoring to periodically receive the synchronization signal. For example, the electronic device 101 may transmit/receive data for time $T_1$ 1201 and 1213. After the time $T_1$ 1201 and 1213 passes, the electronic device 101 may perform monitoring to receive the synchronization signal for time $T_2$ 1203 and 1215. The electronic device 101 may repeat an operation of transmitting/receiving data according to a predetermined period and performing monitoring. For example, the time intervals of $T_1$ 1201 and 1213 may be (40×n) ms (for example, 40 ms) and the time intervals of $T_2$ 1203 and 1205 may be (40×m) ms (for example, 40 ms). When performing monitoring for the time of $T_2$ 1203, the electronic device 101 may receive synchronization signals from different external electronic devices in a plurality of areas 1205, 1207, 1209, and 1211 included in the time interval of $T_2$ 1203. Each of the plurality of areas 1205, 1207, 1209, and 1211 included in the time interval of $T_2$ 1203 may be a time unit for transmitting synchronization signals by a plurality of external electronic devices. It is assumed that the external electronic device may transmit the synchronization signal in a first area 1207, and the electronic device 101 may receive the synchronization signal of the first external electronic device in the first area 1207.

The electronic device 101 may receive data transmitted from the external electronic device while performing monitoring. For example, as illustrated in FIG. 13, the electronic device 101 performing D2D communication may perform monitoring 1309 to periodically receive the synchronization signal. The first external electronic device 1210 performing D2D communication may perform monitoring 1311 to periodically receive the synchronization signal. The electronic device 101 may transmit/receive data in the time interval of $T_1$ 1201 and perform monitoring in the time interval of $T_2$ 1203, and data transmission/reception and monitoring may be repeatedly performed. When data 1301, 1305, and 1307 are transmitted from the first external electronic device 1301 in the time interval of $T_1$ 1201, in which the electronic device 101 transmits/receives data, the electronic device 101 may receive the transmitted data 1301, 1305, and 1307. However, when data 1303 is transmitted from the first external electronic device 1310 in the time interval of $T_2$ 1203, in which the electronic device 101 performs monitoring, the electronic device 101 may not receive the transmitted data 1303. This is known as packet loss. When the electronic device 101 is communicating with the first external electronic device 1310, synchronization is performed using the synchronization signal received from the first external electronic device 1310, and thus it is possible to prevent packet loss by not periodically monitoring surrounding synchronization signals while the data is received. For example, if the electronic device 101 does not perform monitoring, it is possible to prevent packet loss from occurring in areas 1205, 1207, 1209, and 1211, other than the first area 1207.

Figure 14:
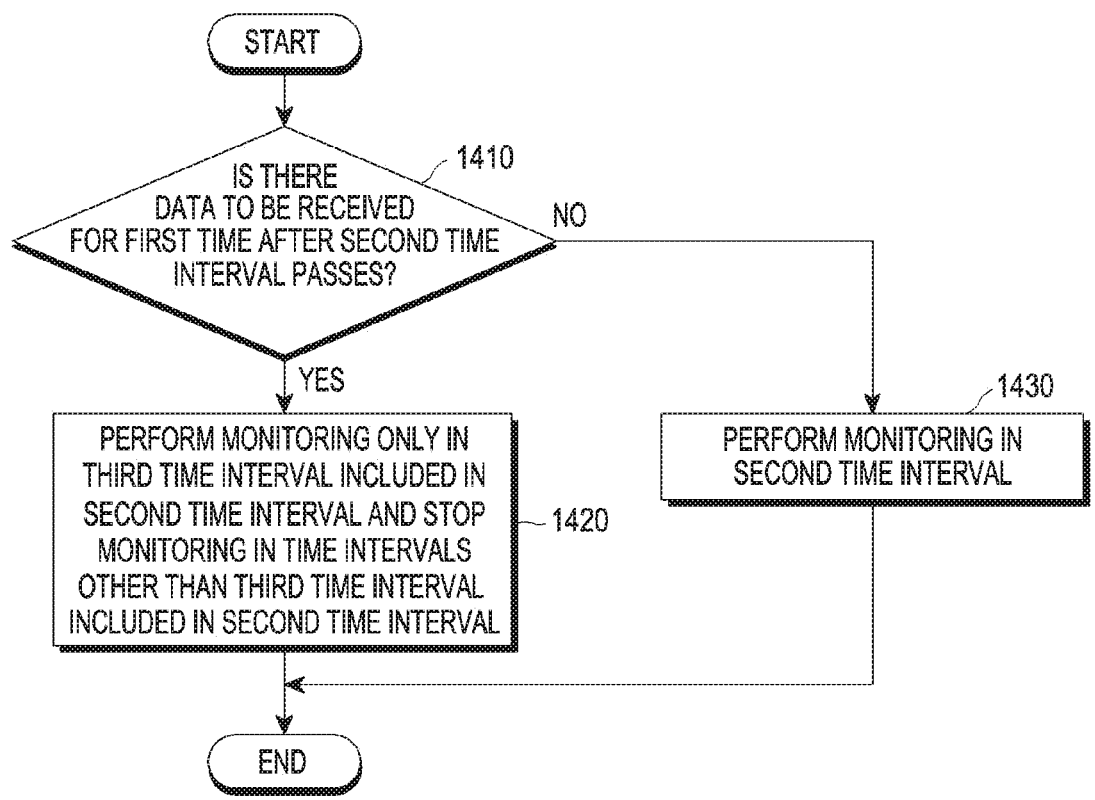
FIG. 14 is a flowchart illustrating an operation in which an electronic device receives a synchronization signal for synchronization according to various embodiments.
Figure 15:
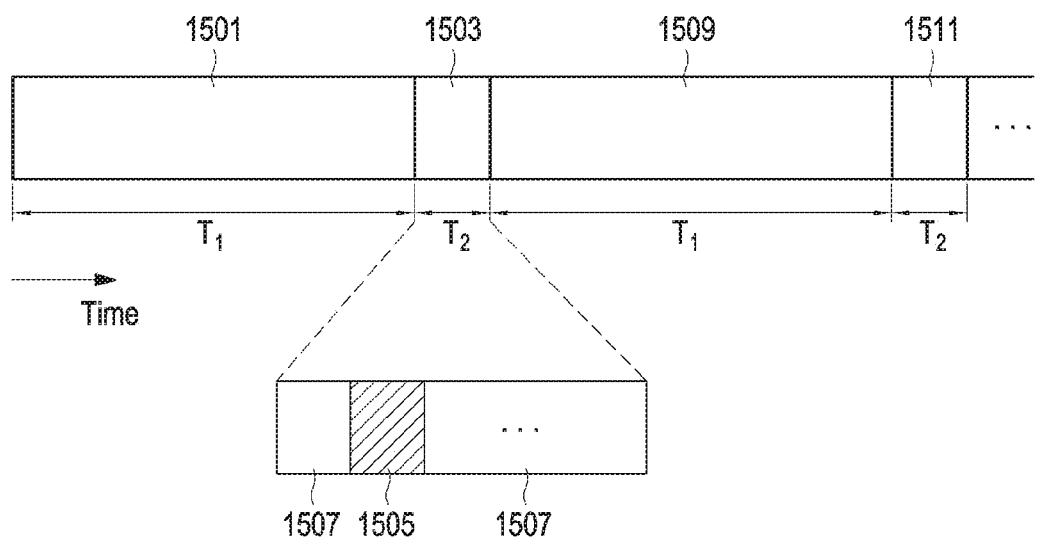
FIG. 15 illustrates an operation in which an electronic device monitors a synchronization signal to prevent packet loss according to various embodiments.
Figure 16:
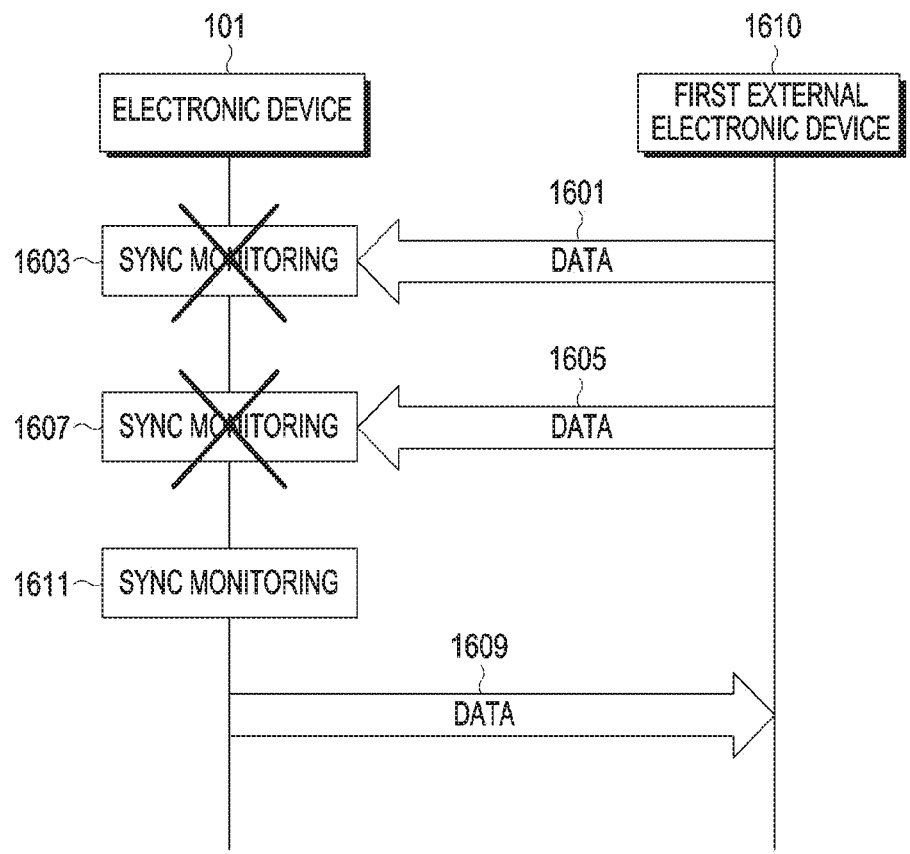
FIG. 16 illustrates an operation of performing monitoring without packet loss according to various embodiments.

FIG. 14 is a flowchart illustrating an operation in which an electronic device receives a synchronization signal for synchronization according to various embodiments. FIG. 15 illustrates an operation in which an electronic device monitors a synchronization signal to prevent packet loss according to various embodiments. FIG. 16 illustrates an operation of performing monitoring without causing packet loss according to various embodiments.

In operation 1410, according to various embodiments, the electronic device 101 may determine whether there is data to be received from the first external electronic device in a first time interval after a second time interval passes. For example, as illustrated in FIG. 15, the electronic device 101 may determine whether there is data to be received from the first external electronic device in a time interval of $T_1$ 1509 after a time interval of $T_2$ 1503 passes. In FIG. 15, the time intervals of $T_1$ 1501 and 1509 may be time intervals in which the electronic device 101 transmits and receives data to and from the external electronic device, and the time intervals of $T_2$ 1503 and 1511 may be time intervals in which the electronic device 101 performs monitoring to receive the synchronization signal from at least one external electronic device. For example, the time interval of $T_1$ 1501 may be 400 ms, and the time interval of $T_2$ 1503 may be 40 ms.

Referring back to FIG. 14, according to various embodiments, when there is data to be received from the first external electronic device, the electronic device 101 may perform monitoring only in a third time interval included in the second time interval and stop monitoring in time intervals other than the third time interval in the second time interval when the first time interval passes in operation 1420. For example, as illustrated in FIG. 15, when there is data to be received from the first external electronic device in the time interval of $T_1$ 1509, the electronic device 101 may perform monitoring only in a first area 1505 in a time interval of T2 1503 and stop monitoring in an area 1507 other than the first area 1505 during the time interval of $T_2$ 1503 when the time interval of $T_1$ 1501 passes. When receiving data from the external electronic device, the electronic device 101 may receive data without any packet loss by stopping monitoring in the area 1507 other than the first area 1505 during the time interval of $T_2$ 1503.

Referring back to FIG. 14, according various embodiments, when there is data to be transmitted to the first external electronic device, the electronic device 101 may perform monitoring during all of the second time intervals when the first time interval passes in operation 1430. For example, as illustrated in FIG. 15, when there is data to be transmitted to the first external electronic device during the time interval of $T_1$ 1509, the electronic device 101 may perform monitoring in all of the time interval of $T_2$ 1503 when the time interval of $T_1$ 1501 passes. For example, the electronic device 101 may receive the synchronization signal from the first external electronic device in the first area 1505 and monitoring whether a synchronization signal is received from an external electronic device other than the first external electronic device in the area 1507 other than the first area.

For example, as illustrated in FIG. 16, the electronic device 101 may receive DATA 1601 and 1605 from a first external electronic device 1610 and may stop monitoring during reception of the DATA 1601 and 1605, as indicated by reference numerals 1603 and 1607. Further, when DATA 1609 is to be transmitted to the first external electronic device 1601, the electronic device 101 may perform monitoring 1611 before transmission of the DATA 1609.

According to various embodiments, when there is no data to be transmitted, the electronic device 101 may perform an operation for stopping monitoring to receive the synchronization signal from the external device rather than the device with which the connection for communication is established. Accordingly, when there is no data to be transmitted, the electronic device 101 may prevent the generation of packet loss.

Figure 17:
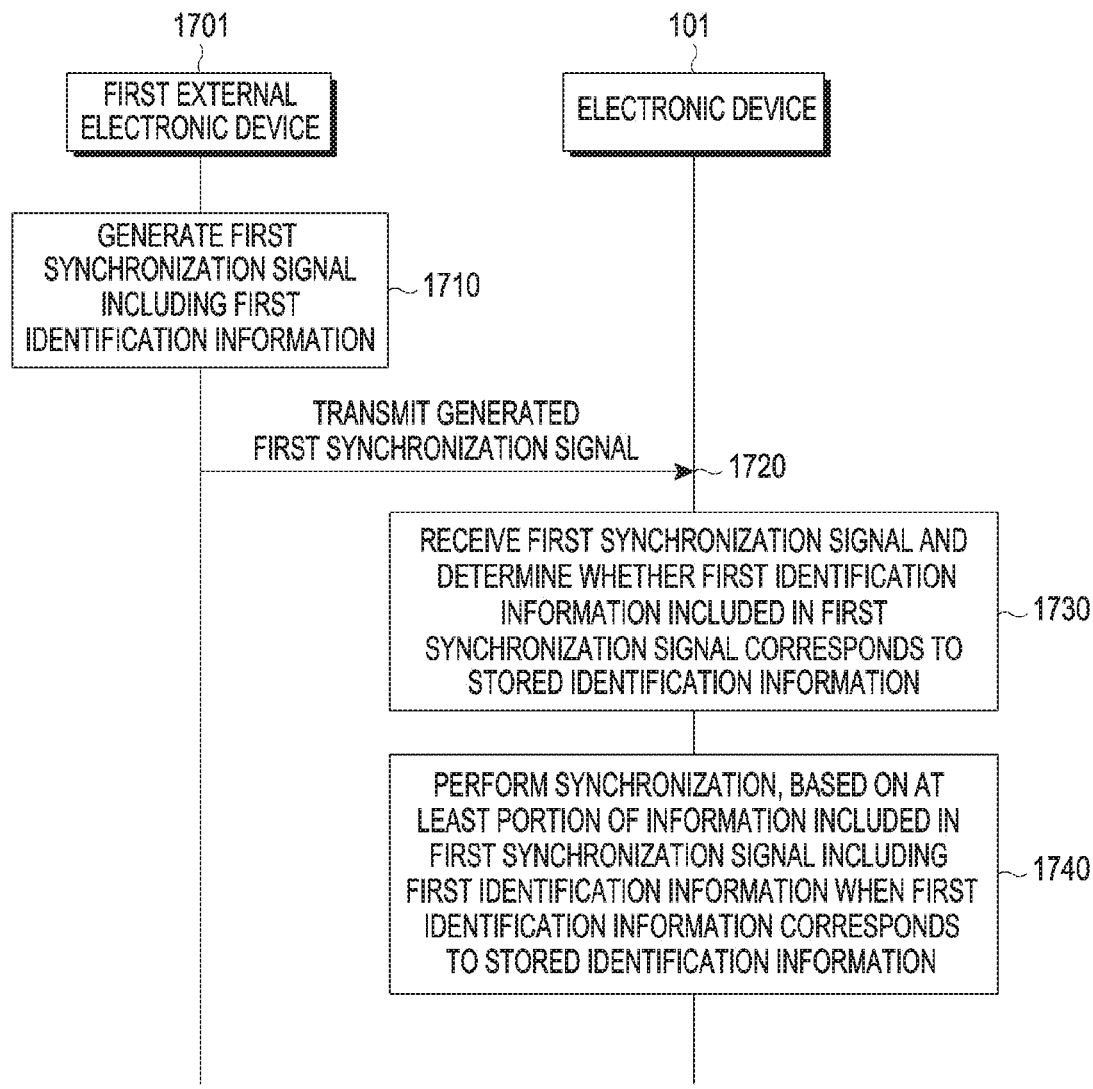
FIG. 17 is a flowchart illustrating operations of an electronic device and a first external electronic device according to various embodiments.

FIG. 17 is a flowchart illustrating operations of an electronic device and a first external electronic device according to various embodiments.

According to various embodiments, in operation 1710, a first external electronic device 1701 may generate a synchronization signal including first identification information. For example, as described above, the first external electronic device 1701 may generate a synchronization signal including identification information using a Prose layer-2 group ID or layer-2 ID in a reserved area of the MIB-SL, some values of upper/lower values, or a specific value applicable to all D2D services, and service-level information indicating the number of relays of the synchronization signal from an initial source device, a range indicating the application to all groups or individual groups, or a priority. In operation 1720, the first external electronic device 1701 may transmit the generated synchronization signal to the electronic device 101. Upon receiving the synchronization signal, the electronic device 101 may determine whether the first identification information included in the first synchronization signal corresponds to stored identification information in operation 1730. For example, the electronic device 101 may determine whether the Prose layer-2 group ID or the layer-2 ID included in the first synchronization signal corresponds to the stored identification information. The stored identification information may be the Prose layer-2 group ID or the layer-2 ID with which the electronic device 101 communicates. When the first identification information corresponds to the stored identification information, the electronic device 1740 may perform synchronization on the basis of at least some of the information included in the first synchronization signal in operation 1740.

According to various embodiments, the electronic device 101 may perform synchronization using the synchronization signal corresponding to (D2D) communication that the electronic device 101 is currently performing among a plurality of received synchronization signals. Meanwhile, if there is no corresponding synchronization signal, the electronic device 101 may perform synchronization in consideration of the strength and/or priority of the signal.

Figure 18:
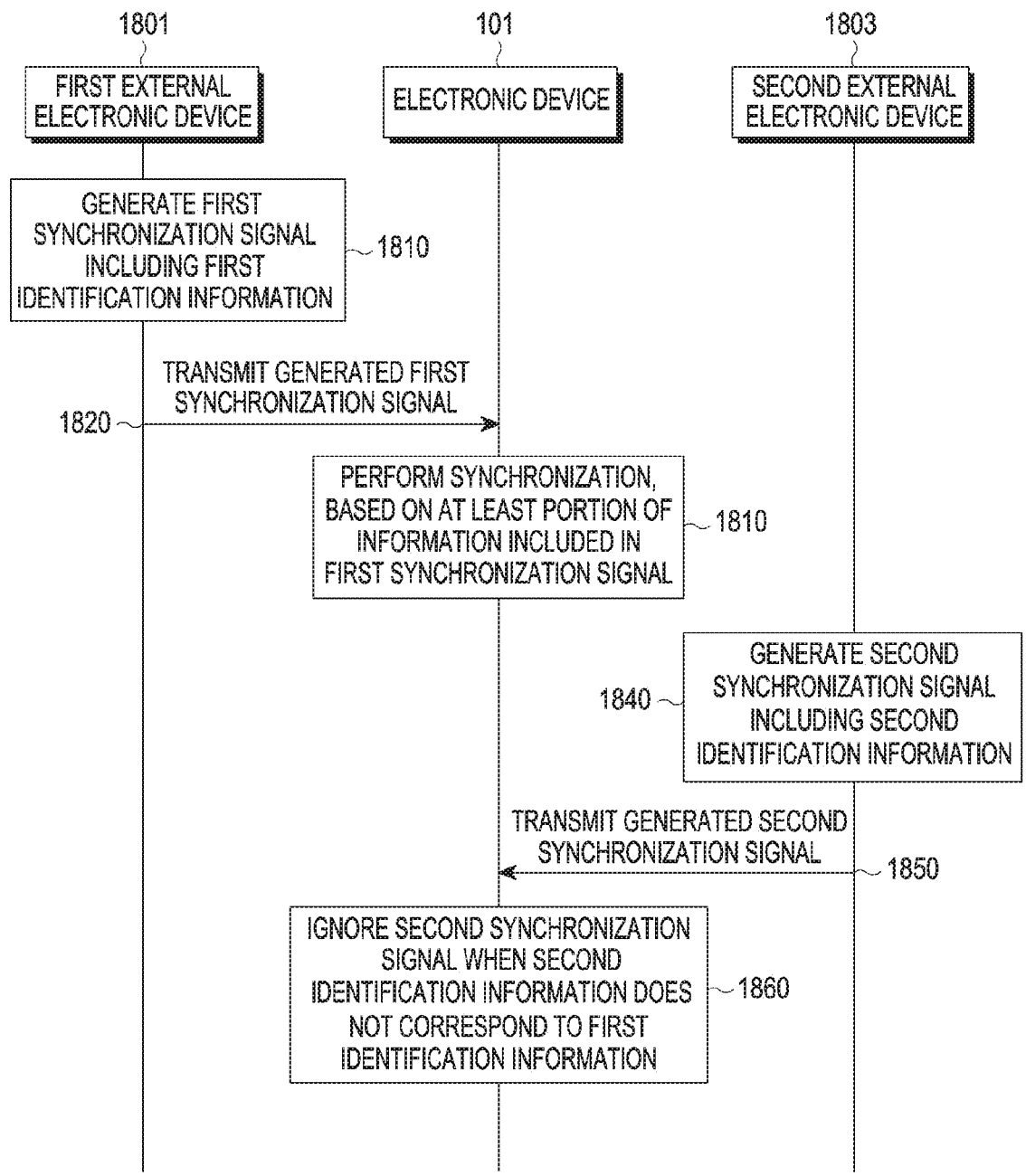
FIG. 18 is a flowchart illustrating operations of an electronic device, a first external electronic device, and a second external electronic device according to various embodiments.

FIG. 18 is a flowchart illustrating operations of an electronic device, a first external electronic device, and a second external electronic device according to various embodiments.

In operation 1810, a first external electronic device 1801 may generate a first synchronization signal including first identification information. For example, as described above, the first external electronic device 1801 may generate a synchronization signal including a group A indicating a Prose layer-2 group ID or a layer-2 ID in the reserved area of the MIB-SL. In operation 1820, the first external electronic device 1801 may transmit the generated first synchronization signal to the electronic device 101. Upon receiving the first synchronization signal, the electronic device 101 may perform synchronization with the first external electronic device 1801 on the basis of at least some of the information included in the received first synchronization signal in operation 1830. In operation 1840, a second external electronic device 1803 may generate a second synchronization signal including second identification information. For example, as described above, the second external electronic device 1803 may generate a synchronization signal including a group B indicating a Prose layer-2 group ID or a layer-2 ID in the reserved area of the MIB-SL. In operation 1850, the second external electronic device 1803 may transmit the generated second synchronization signal to the electronic device 101. When the second synchronization signal is received in operation 1850, the electronic device 101 may ignore the second synchronization signal if the second identification information does not correspond to the first identification information in operation 1860. For example, the electronic device 101 may determine that the group A, which is the first identification information, does not correspond to the group B, which is the second identification information, and ignore the second synchronization signal.

Figure 19:
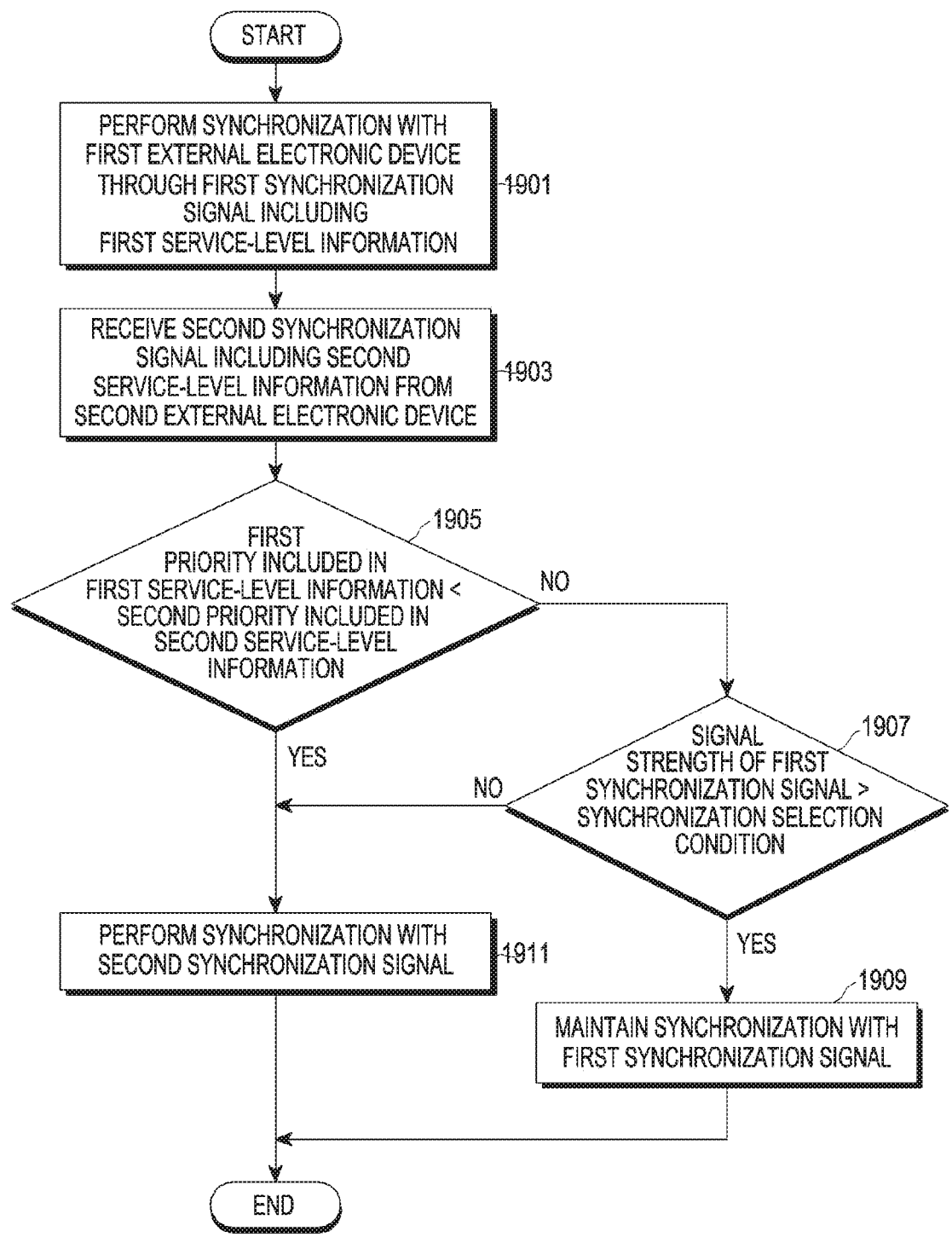
FIG. 19 is a flowchart illustrating an operation of an electronic device according to various embodiments.

FIG. 19 is a flowchart illustrating an operation of an electronic device according to various embodiments.

According to various embodiments, the electronic device 101 (for example, the processor 120) may perform synchronization with a first external electronic device on the basis of a first synchronization signal including first service-level information in operation 1901.

The electronic device 101 may receive a second synchronization signal including second service-level information from a second external electronic device in operation 1903.

The electronic device 101 may determine whether a first priority included in the first service-level information is lower than a second priority included in the second service-level information in operation 1905. Specifically, the service-level information may include priority information. For example, the configuration of priority information as "0" may mean the performance of synchronization according to the 3GPP standard. For example, the configuration of priority information as "1" may indicate a normal priority, and the configuration of priority information as "2" may indicate a priority higher than "1".

When the first priority included in the first service-level information is higher than the second priority included in the second service-level information, the electronic device 101 may determine whether the strength of the first synchronization signal is higher than a synchronization selection condition in operation 1907.

When the strength of the first synchronization signal is higher than the synchronization selection condition, the electronic device 101 may maintain synchronization with the first synchronization signal in operation 1909. That is, although a second synchronization signal having a lower priority than the first synchronization signal is received in the state in which the electronic device is synchronized with the synchronization signal having the strength higher than the synchronization selection condition, the electronic device 101 may maintain the synchronization with the first synchronization signal.

When the first priority included in the first service-level information is lower than the second priority included in the second service-level information, the electronic device 101 may perform synchronization with the second synchronization signal in operation 1911. That is, when a synchronization signal having a higher priority than the synchronized synchronization signal is received, the electronic device 101 may perform synchronization with the synchronization signal having the higher priority by reselecting the synchronization signal having the higher priority.

Alternatively, when the strength of the first synchronization signal is lower than the synchronization selection condition, the electronic device 101 may perform synchronization with the second synchronization signal in operation 1911.

According to various embodiments, an electronic device (for example, the electronic device 101) may include a communication circuit (for example, the communication module 190), a processor (for example, the processor 120), and a memory (for example, the memory 130) electrically connected to the processor (for example, the processor 120), wherein the memory (for example, the memory 130) may store instructions causing the processor (for example, the processor 120) to, when executed, receive a first synchronization signal including first identification information and first service-level information from a first external electronic device (for example, the first external electronic device 701) through the communication circuit (for example, the communication module 190), perform synchronization of the first external electronic device (for example, the first external electronic device 701) with the electronic device (for example, the electronic device 101) based on at least some pieces of information included in the first synchronization signal, receive a second synchronization signal including second identification information and second service-level information from a second external electronic device (for example, the second external electronic device 703) through the communication circuit (for example, the communication module 190), and control whether to perform synchronization with the second external electronic device based on the second identification information, the second service-level information, the first identification information, and the first service-level information.

According to various embodiments, the memory (for example, the memory 130) may store instructions causing the processor (for example, the processor 120) to, when executed, perform control to perform synchronization with the second external electronic device (for example, the second external electronic device 703) when the second identification information corresponds to the first identification information, and to ignore the second synchronization signal when the second identification information does not correspond to the first identification information.

According to various embodiments, the first identification information and the first service-level information may be included in a reserved field of a master information block (MIB-SL) of the first synchronization signal, and the reserved field of the master information block may be defined in a $3^{rd}$-Generation Partnership Project (3GPP).

According to various embodiments, the first identification information may include information for identifying a first group including the first external electronic device (for example, the first external electronic device 701) or the first external electronic device (for example, the first external electronic device 701), and the second identification information may include information for identifying a second group including the second external electronic device (for example, the second external electronic device 703) or the second external electronic device (for example, the second external electronic device 703).

According to various embodiments, the first identification information may include at least one of at least some values of a Proximity-Based Services (Prose) layer-2 group ID of the first external electronic device (for example, the first external electronic device 701) or at least some values of a layer-2 ID, and the second identification information may include at least one of at least some values of a Prose layer-2 group ID of the second external electronic device (for example, the second external electronic device 703) or at least some values of a layer-2 ID.

According to various embodiments, the first identification information is a preset value which represents a first group including the first external electronic device (for example, the first external electronic device 410) and at least one second group which does not include the first external electronic device (for example, the first external electronic device 701), and the second external electronic device (for example, the second external electronic device 703) may not belong to the first group or to the second group.

According to various embodiments, the first identification information may include service-level information including information on the number of relays of the first synchronization signal from a source device (for example, the fourth external electronic device 904) and range information indicating the range of a group to which the first synchronization signal is applied or priority information indicating a priority.

According to various embodiments, the memory (for example, the memory 130) may store instructions causing the processor (for example, the processor 120) to, when executed, as at least a part of performing synchronization between the electronic device (for example, the electronic device 101) and the first external electronic device (for example, the first external electronic device 701), perform synchronization with the first external electronic device (for example, the first external electronic device 701), based on at least some pieces of information included in the first synchronization signal when information on the number of relays of the first synchronization signal from a source device (for example, the fourth external electronic device 904) is equal to or smaller than a preset value, and ignore the first synchronization signal when the information on the number of relays of the first synchronization signal from the source device (for example, the fourth external electronic device 904) is larger than the preset value.

According to various embodiments, the memory (for example, the memory 130) may store instructions causing the processor (for example, the processor 120) to, when executed, receive a third synchronization signal including third identification information and third service-level information from a third external electronic device (for example, the third external electronic device 705) before establishing an initial connection to the first external electronic device (for example, the first external electronic device 701) through the communication circuit (for example, the communication module 190), establish the initial connection of the electronic device (for example, the electronic device 101), based on at least some pieces of information included in the first synchronization signal when the strength of the first synchronization signal is higher than the strength of the third synchronization signal, and store identification information of the first external electronic device (for example, the first external electronic device 701).

According to various embodiments, the memory (for example, the memory 130) may store instructions causing the processor (for example, the processor 120) to, when executed, perform monitoring for at least a portion of a second time interval through the communication circuit (for example, the communication module 190) when a first time interval passes, and as at least a part of performing the monitoring, perform monitoring for the second time interval when the electronic device (for example, the electronic device 101) transmits data, and receive the first synchronization signal from the first external electronic device (for example, the first external electronic device 701) for a third time interval included in the second time interval and stop monitoring in time intervals other than the third time interval in the second time interval when the electronic device (for example, the electronic device 101) receives data.

According to various embodiments, an electronic device (for example, the electronic device 101) may include a communication circuit (for example, the communication module 190), a processor (for example, the processor 120), and a memory (for example, the memory 130) electrically connected to the processor (for example, the processor 120), wherein the memory (for example, the memory 130) may store instructions causing the processor to, when executed, receive a first synchronization signal including first identification information and first service-level information from a first external electronic device (for example, the first external electronic device 701) through the communication circuit (for example, the communication module 190), and when the first identification and the first service-level information correspond to identification information stored in the memory (for example, the memory 130), perform synchronization with the first external electronic device (for example, the first external electronic device 701), based on at least some pieces of information included in the first synchronization signal, and ignore the first synchronization signal when the first identification information does not correspond to the identification information stored in the memory (for example, the memory 130).

According to various embodiments, the first identification information and the first service-level information may be included in a reserved field of a master information block (MIB-SL) of the first synchronization signal, and the reserved field of the master information block may be as defined in the $3^{rd}$-Generation Partnership Project (3GPP).

According to various embodiments, the first identification information may include information for identifying a first group including the first external electronic device (for example, the first external electronic device 701) or the first external electronic device (for example, the first external electronic device 701), and the second identification information may include information for identifying a second group including the second external electronic device (for example, the second external electronic device 703) or the second external electronic device (for example, the second external electronic device 703).

According to various embodiments, the first identification information may include at least one of at least some values of a Proximity-Based Services (Prose) layer-2 group ID of the first external electronic device (for example, the first external electronic device 701) or at least some values of a layer-2 ID.

According to various embodiments, the first identification information may be a preset value which represents a first group including the first external electronic device (for example, the first external electronic device 701) and a second group which does not include the first external electronic device (for example, the first external electronic device 701).

According to various embodiments, the first identification information may include service-level information indicating information on the number of relays of the first synchronization signal from a source device (for example, the fourth external electronic device 904) and range information indicating a range to which the first synchronization signal is applied or priority information indicating a priority.

According to various embodiments, the memory (for example, the memory 130) may store instructions causing the processor (for example, the processor 120) to, when executed, as at least a part of performing synchronization between the electronic device (for example, the electronic device 101) and the first external electronic device (for example, the first external electronic device 701), perform synchronization with the first external electronic device (for example, the first external electronic device 701), based on at least some pieces of information included in the first synchronization signal when information on the number of relays of the first synchronization signal from a source device (for example, the fourth external electronic device 904) is equal to or smaller than a preset value, and ignore the first synchronization signal when the information on the number of relays of the first synchronization signal from the source device (for example, the fourth external electronic device 904) is larger than the preset value.

According to various embodiments, the memory (for example, the memory 130) may store instructions causing the processor (for example, the processor 120) to, when executed, receive a second synchronization signal including second identification information from a second external electronic device through the communication circuit (for example, the communication module 190), establish an initial connection between the first external electronic device (for example, the first external electronic device 701) and the electronic device (for example, the electronic device 101) based on at least some pieces of information included in the first synchronization signal when the strength of the first synchronization signal is higher than the strength of the second synchronization signal, and store identification information of the first external electronic device (for example, the first external electronic device 701).

According to various embodiments, the memory (for example, the memory 130) may store instructions causing the processor (for example, the processor 120) to, when executed, perform monitoring for at least a portion of a second time interval through the communication circuit (for example, the communication module 190) when a first time interval passes, perform monitoring for the second time interval when the electronic device (for example, the electronic device 101) transmits data, receive the first synchronization signal from the first external electronic device (for example, the first external electronic device 701) for a third time interval included in the second time interval, and stop monitoring for a time interval except for the third time interval in the second time interval when the electronic device (for example, the electronic device 101) receives data.

According to various embodiments, an electronic device (for example, the electronic device 101) may include a communication circuit (for example, the communication module 190), a processor, and a memory (for example, the memory 130) electrically connected to the processor (for example, the processor 120), wherein the memory (for example, the memory 130) may store instructions causing the processor (for example, the processor 120) to, when executed, perform control to generate a synchronization signal including identification information of the electronic device (for example, the electronic device 101) in a reserved field of a master information block (MIB-SL) defined according to the 3rd-Generation Partnership Project (3GPP) and transmit the generated synchronization signal to a first external electronic device (for example, the first external electronic device 410) through the communication circuit.

According to various embodiments, the identification information may be a Proximity-based Services (Prose) layer-2 group ID of the electronic device (for example, the electronic device 101) or a layer-2 ID (or upper/lower values of the same).

According to various embodiments, the instructions may cause the processor (for example, the processor 120) to generate a synchronization signal further including service-level information including information on the number of relays from a source device (for example, the fourth external electronic device 904) and range information indicating the range of a group to which the synchronization signal is applied or priority information indicating a priority as at least a part of generating the synchronization signal.

According to various embodiments, the memory (for example, the memory 130) may store instructions causing the processor (for example, the processor 120) to, when executed, perform synchronization between the electronic device (for example, the electronic device 101) and the first external electronic device (for example, the first external electronic device 410), and the identification information included in the synchronization signal may correspond to identification information of the first external electronic device (for example, the first external electronic device 410).

The electronic device according to various embodiments may be one of various types of devices. The electronic devices may include, for example, at least one of a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, and/or replacements for a corresponding embodiment. With regard to the description of the drawings, similar reference numerals may be used to refer to similar elements. A singular expression may include a plural expression, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. Such terms as "1st", "2nd," "first", or "second" may represent corresponding components regardless of order or importance, may be used to simply distinguish one component from another, and do not limit the corresponding components. When it is described that an element (e.g., a first element) is "(operatively or communicatively) coupled" with/to or "connected" to another element (e.g., a second element), the element can be directly connected to the other element or can be connected to the other element through another element (e.g., a third element).

As used herein, the term "module" may include a unit configured in hardware, software, or firmware, and may interchangeably be used with other terms, for example, "logic," "logic block," "part," or "circuitry". A module may be a single integral component, or a minimum unit or part thereof, adapted to perform one or more functions. For example, the module may be configured as an application-specific integrated circuit (ASIC).

Various embodiments as set forth herein may be implemented as software (e.g., the program 140) including an instruction that is stored in a machine-readable storage medium (e.g., internal memory 136 or external memory 138) that is readable by a machine (e.g., a computer). The machine is a device capable of invoking the stored instruction from the storage medium and operating according to the invoked instruction, and may include the electronic device (e.g., the electronic device 101) according to the embodiments set forth herein. When the instruction is executed by the processor (e.g., the processor 120), the processor may perform functions corresponding to the instruction directly, or functions corresponding to the instruction can be performed using other components under the control of the processor. The instruction may include a code generated or executed by a compiler or an interpreter. The machine-readable storage medium may be provided in the form of a non-transitory storage medium. Wherein, the term "non-transitory" simply means that the storage medium is a tangible device, and does not include a signal, but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed online via an application store (e.g., Play Store™). If distributed online, at least part of the computer program product may be temporarily generated or at least temporarily stored in the storage medium, such as memory of the manufacturer's server, a server of the application store, or a relay server.

Each component (e.g., a module or a program) according to various embodiments may include a single entity or multiple entities. Some of the above-described sub-components may be omitted, or other sub-components may be added to various embodiments. Alternatively or additionally, some components (e.g., modules or programs) may be integrated into a single entity, and the single entity may still perform the same or similar functions performed by each of corresponding components before the integration. According to various embodiments, operations performed by the module, the program, or another component may be carried out sequentially, in parallel, repeatedly, or heuristically, or at least some operation may be executed in a different order or omitted, or other operations may be added.

The invention claimed is:
1. An electronic device comprising:
a communication circuit;
a processor configured to control the communication circuit; and
a memory electrically connected to the processor,
wherein the memory stores instructions causing the processor to, when executed,
identify whether there is first data to be transmitted or second data to be received from a first external electronic device during a first time interval,
in response to an identification that there is the first data to be transmitted, during a second time interval preceding the first time interval, perform a monitoring operation to determine whether a first synchronization signal is received from the first external electronic device,
in response to an identification that there is the second data to be received, perform the monitoring operation during a third time interval included in the second time interval, and stop the monitoring operation during a remaining time interval other than the third time interval among the second time interval,
receive the first synchronization signal including first identification information from the first external electronic device based on the performed monitoring operation, and
in response to the first identification information corresponding to identification information stored in the memory, perform synchronization with the first external electronic device based on the first synchronization signal.

2. The electronic device of claim 1, wherein the memory stores instructions causing the processor to, when executed, ignore the first synchronization signal in response to the first identification information not corresponding to the identification information stored in the memory.

3. The electronic device of claim 1, wherein the first identification information is included in a reserved field of a master information block (MIB-SL) of the first synchronization signal, and the reserved field of the master information block is a reserved field defined in a 3rd generation partnership project (3GPP).

4. The electronic device of claim 1, wherein the first identification information includes at least one of at least some values of a proximity based services (Prose) layer-2 group identifier (ID) of the first external electronic device or at least some values of a layer-2 ID.

5. The electronic device of claim 1, wherein the first identification information includes a service-level information, the service-level information includes at least some pieces of information on a number of relays of the first synchronization signal from the first external electronic device and range information indicating a range of a group to which the first synchronization signal is applied or priority information indicating a priority of the first synchronization signal.

6. The electronic device of claim 1, wherein the instructions cause the processor to, as at least a part of performing the synchronization, perform synchronization with the first external electronic device based on the first synchronization signal in response to information on a number of relays of the first synchronization signal from the first external electronic device being equal to or smaller than a preset value, and ignore the first synchronization signal in response to the information on the number of relays of the first synchronization signal from the first external electronic device is larger than the preset value.

7. The electronic device of claim 1, wherein the instructions cause the processor to receive a second synchronization signal including second identification information from a second external electronic device through the communication circuit, establish an initial connection between the first external electronic device and the electronic device, based on the first synchronization signal in response to a strength of the first synchronization signal being higher than a strength of the second synchronization signal, and store identification information of the first external electronic device.

8. The electronic device of claim 1, wherein the instructions cause the processor to:

receive a second synchronization signal including second identification information from a second external electronic device through the communication circuit, and control whether to perform synchronization with the second external electronic device based on the first identification information and the second identification information.

* * * * *